United States Patent
Fiedler et al.

(10) Patent No.: US 10,212,993 B2
(45) Date of Patent: Feb. 26, 2019

(54) CLOSURE DEVICE

(71) Applicant: Fidlock GmbH, Hannover (DE)

(72) Inventors: Joachim Fiedler, Hannover (DE);
Artur Tucholke, Hannover (DE)

(73) Assignee: Fidlock GmbH, Hannover (DE)

( * ) Notice: Subject to any disclaimer, the term of this patent is extended or adjusted under 35 U.S.C. 154(b) by 401 days.

(21) Appl. No.: 14/889,025

(22) PCT Filed: May 24, 2013

(86) PCT No.: PCT/EP2013/060762
§ 371 (c)(1),
(2) Date: Nov. 4, 2015

(87) PCT Pub. No.: WO2014/180512
PCT Pub. Date: Nov. 13, 2014

(65) Prior Publication Data
US 2016/0073744 A1 Mar. 17, 2016

(30) Foreign Application Priority Data
May 8, 2013 (EP) .................................. 13167140

(51) Int. Cl.
*A44B 11/25* (2006.01)
*A44B 99/00* (2010.01)
*F16B 1/00* (2006.01)

(52) U.S. Cl.
CPC .......... *A44B 99/00* (2013.01); *A44B 11/2588* (2013.01); *F16B 1/00* (2013.01);
(Continued)

(58) Field of Classification Search
CPC ..... Y10T 24/32; A44B 99/00; A44B 11/2588; A44D 2203/00; F16B 1/00
See application file for complete search history.

(56) References Cited

U.S. PATENT DOCUMENTS

| 2,615,227 | A |   | 10/1952 | Hornik |
| 2,648,884 | A | * | 8/1953  | Loofboro ............. A44C 5/2071 24/303 |
| 3,293,714 | A | * | 12/1966 | Shafer ................ A44B 11/2596 24/303 |

(Continued)

FOREIGN PATENT DOCUMENTS

| CN | 102726891 A | 10/2012 |
| FR | 2156162      | 5/1973  |

(Continued)

*Primary Examiner* — Abigail E Troy
(74) *Attorney, Agent, or Firm* — The Webb Law Firm

(57) ABSTRACT

A closure device for releasably connecting two parts with each other includes a first closure member and a second closure member attachable to the first closure member and in a closed position is held on the first closure member. The second closure member has a rigid second locking protrusion, wherein the second locking protrusion can be brought into engagement with the first locking protrusion in an engagement direction and in the closed position engages the first locking protrusion in a positive locking manner. The first closure member includes a first magnetic member and the second closure member includes a second magnetic member, the first magnetic member and the second magnetic member being constituted to magnetically attract each other when the second closure member is attached to the first closure member for closing the closure device.

17 Claims, 25 Drawing Sheets

(52) U.S. Cl.
CPC .. *A44D 2203/00* (2013.01); *F16B 2001/0035* (2013.01); *Y10T 24/32* (2015.01)

(56) References Cited

U.S. PATENT DOCUMENTS

| | | | |
|---|---|---|---|
| 3,482,288 A | 12/1969 | Curran | |
| 3,799,610 A | 3/1974 | Hollins | |
| 5,197,168 A * | 3/1993 | Levy | A44C 5/2076 |
| | | | 24/303 |
| 5,377,392 A | 1/1995 | Morita | |
| 5,572,887 A * | 11/1996 | Geswelli | A44C 5/2071 |
| | | | 24/303 |
| 5,664,298 A | 9/1997 | Nessar-Ivanovic | |
| 6,857,169 B2 * | 2/2005 | Chung | A44B 11/258 |
| | | | 24/303 |
| 7,690,088 B2 * | 4/2010 | Kogen | A44C 5/2042 |
| | | | 24/303 |
| 9,101,185 B1 * | 8/2015 | Greenberg | A44C 5/20 |
| 2002/0000024 A1 | 1/2002 | Grunberger | |
| 2002/0083563 A1 | 7/2002 | Nire | |
| 2003/0229974 A1 | 12/2003 | Zemer et al. | |
| 2012/0255144 A1 | 10/2012 | Gaudillere et al. | |

FOREIGN PATENT DOCUMENTS

| | | |
|---|---|---|
| GB | 934933 | 8/1963 |
| JP | 63106311 U | 7/1988 |
| JP | 11244006 A | 9/1999 |
| JP | 2002199908 A | 7/2002 |
| JP | 200428150 A | 1/2004 |
| SU | 507306 | 5/1976 |
| WO | 2009084429 A1 | 7/2009 |

* cited by examiner

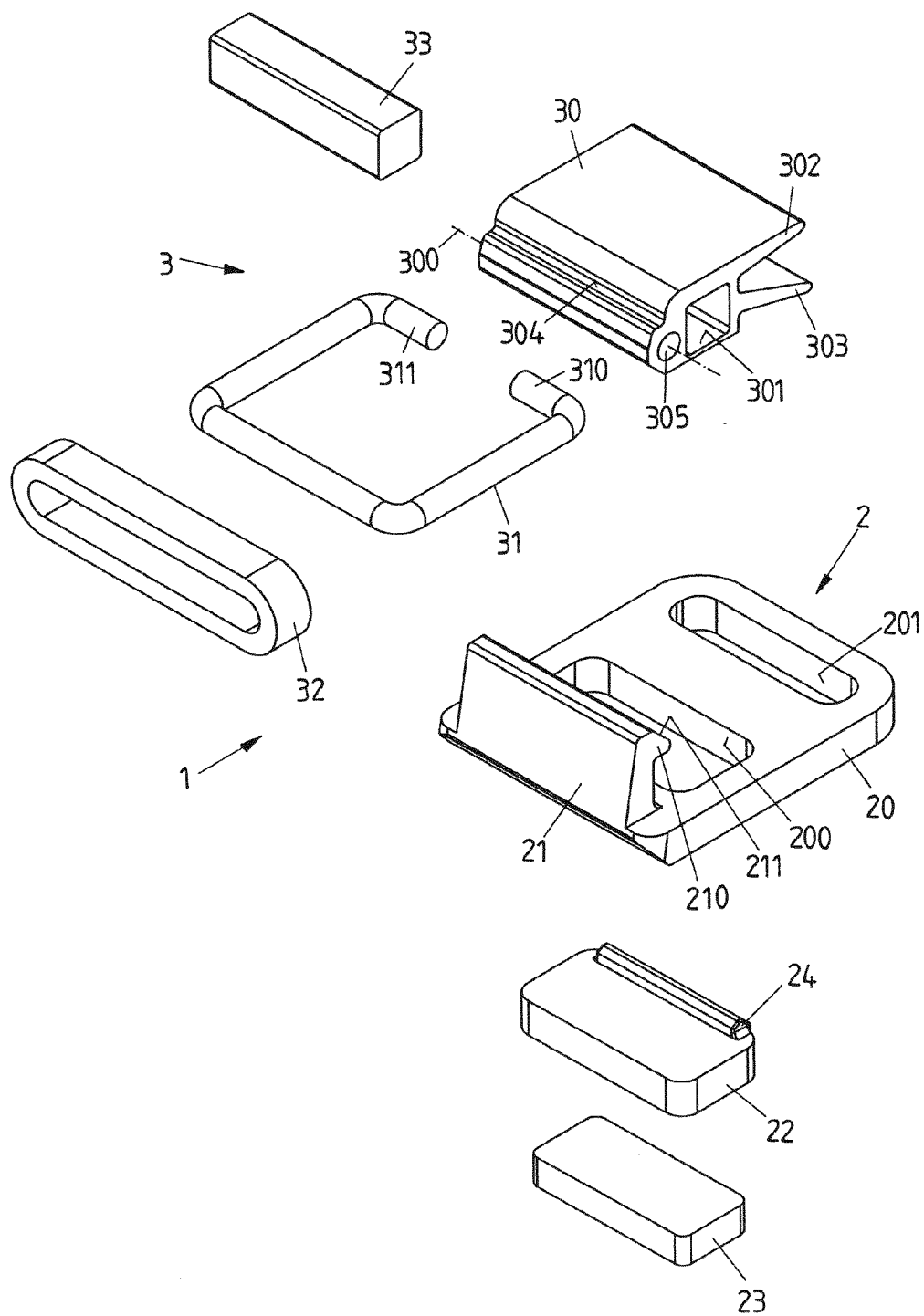

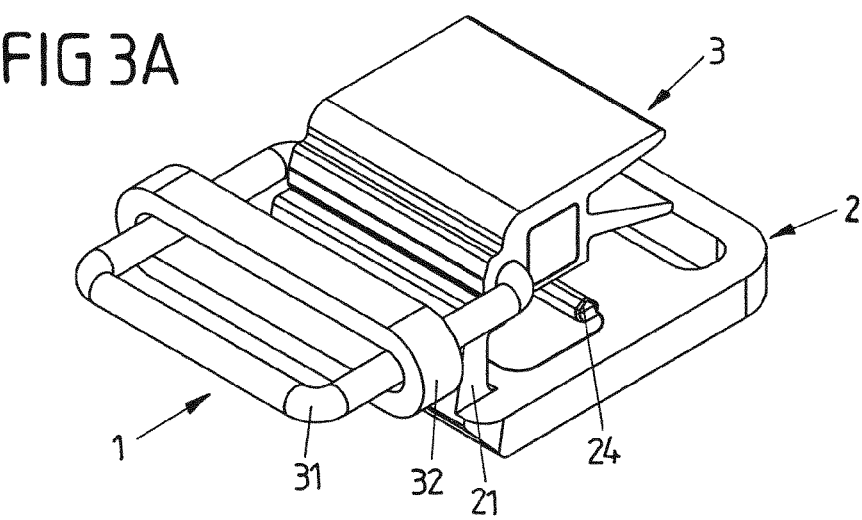
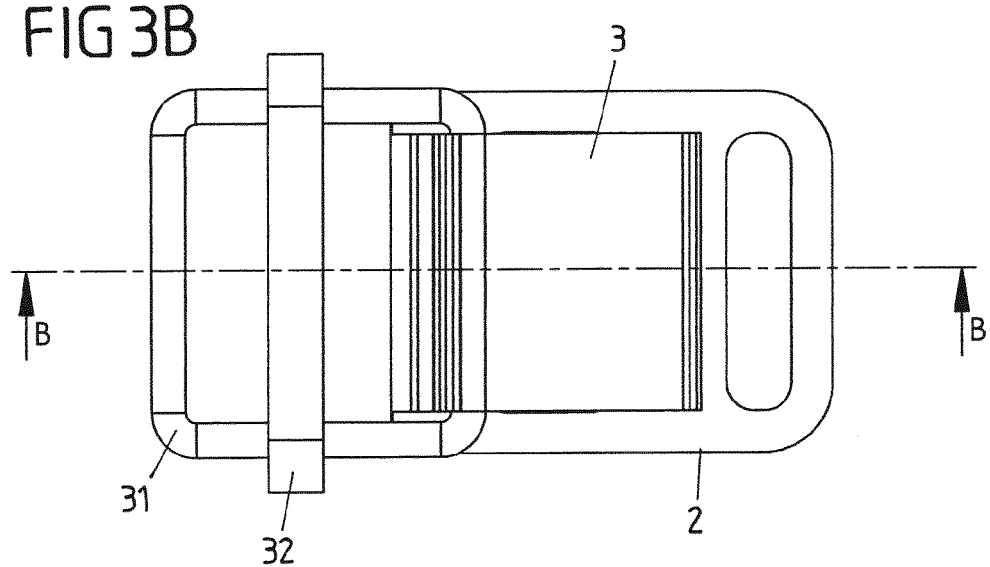
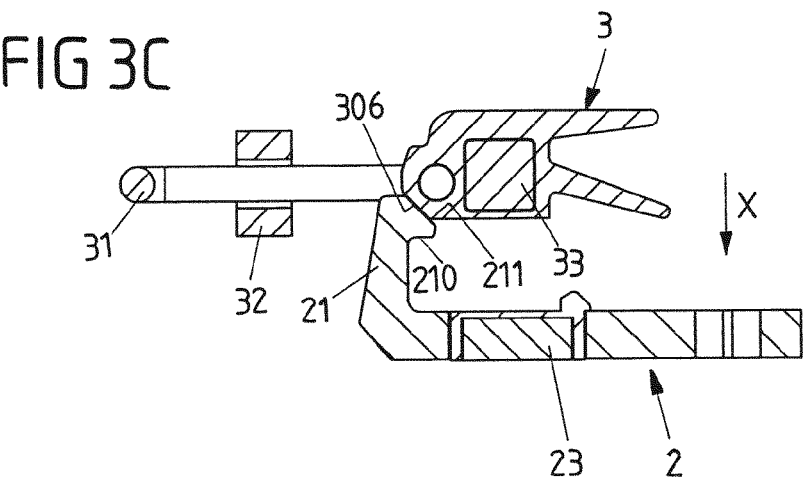

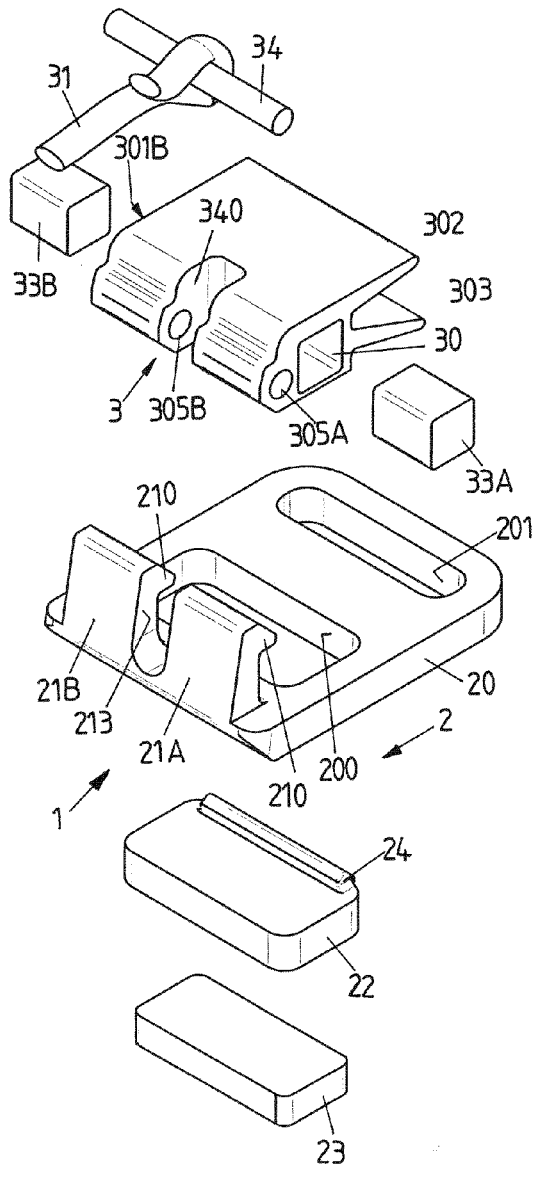
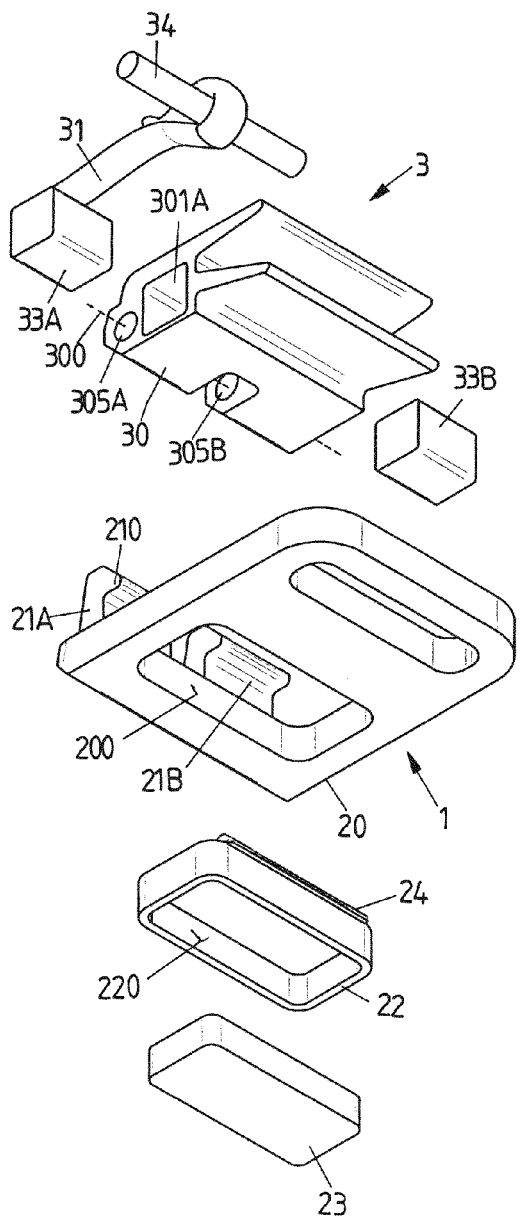

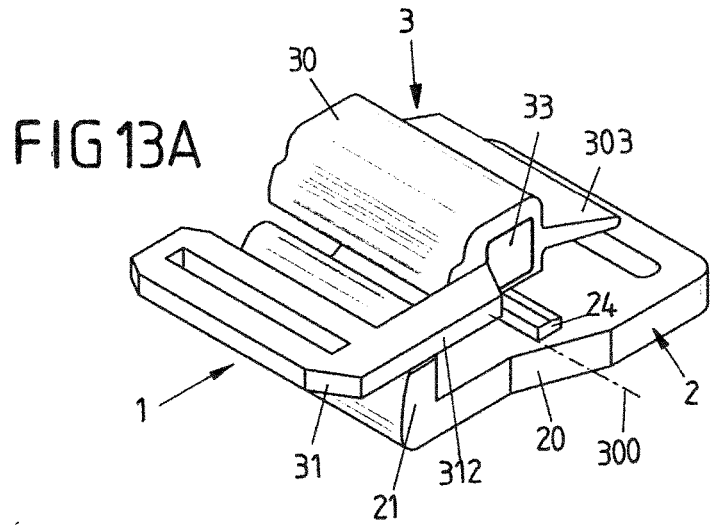
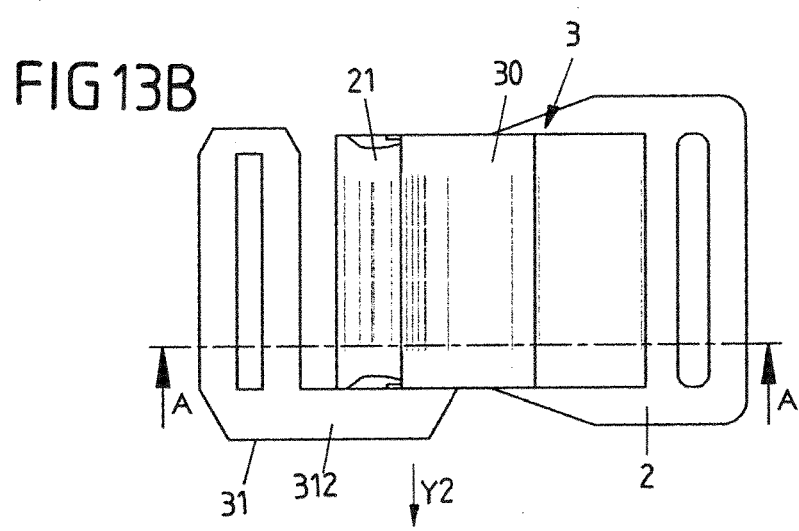
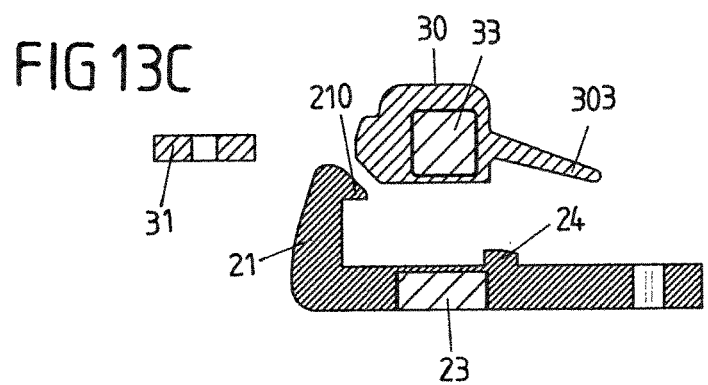

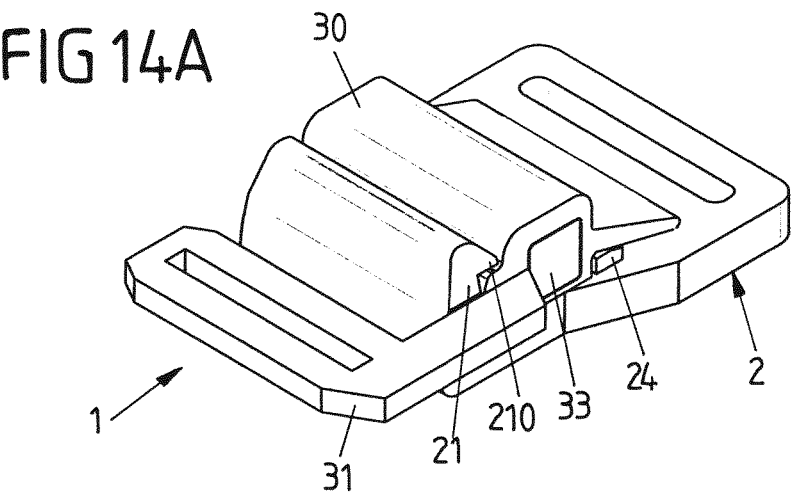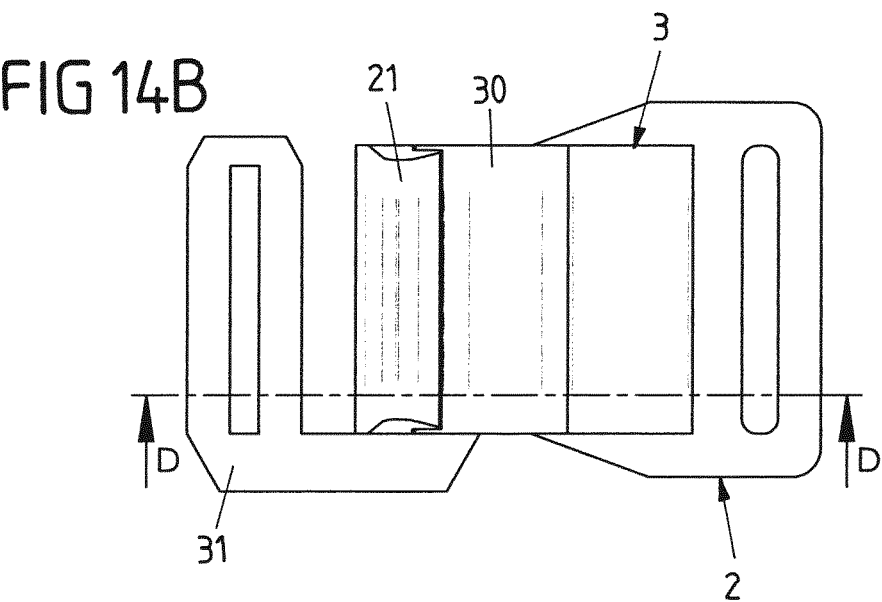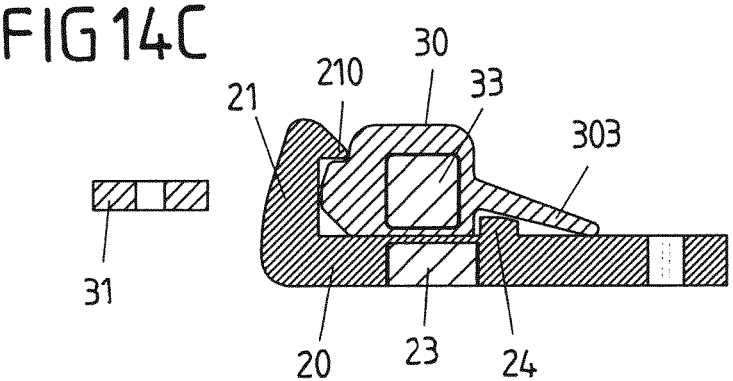

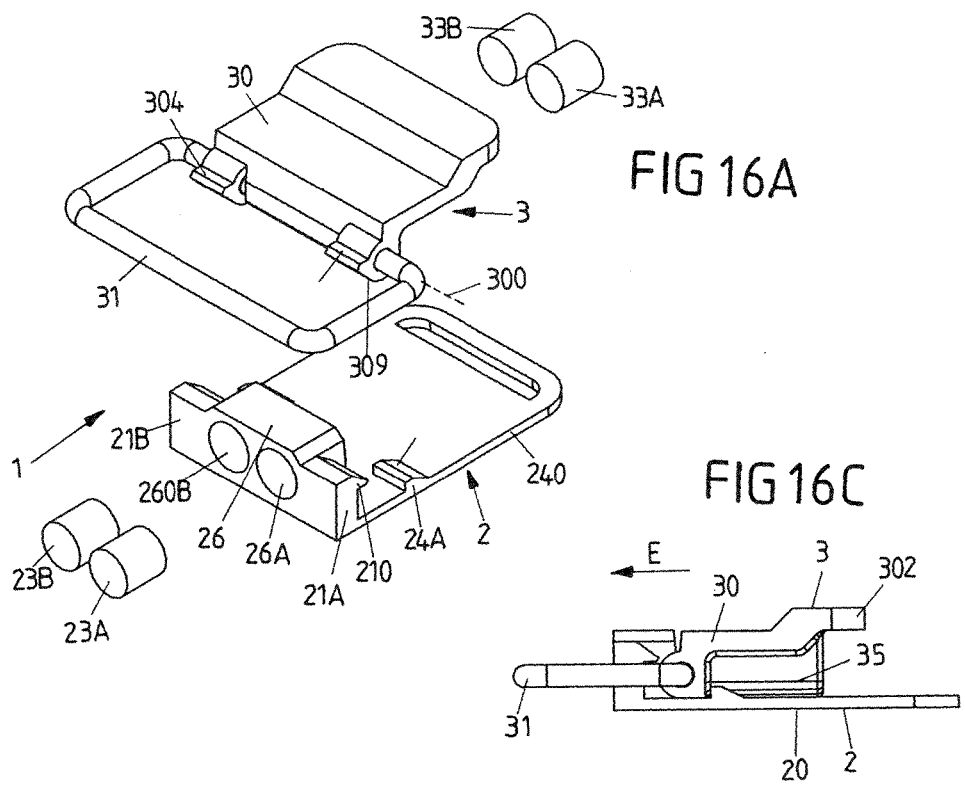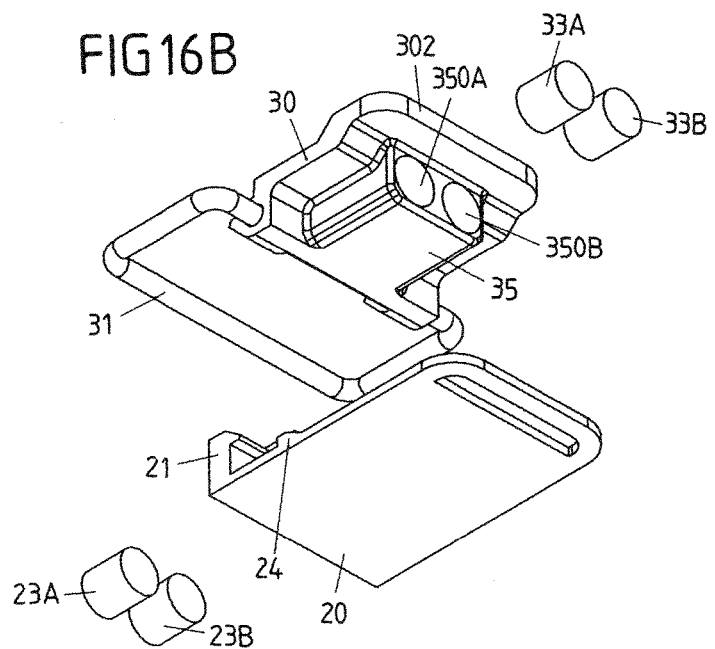

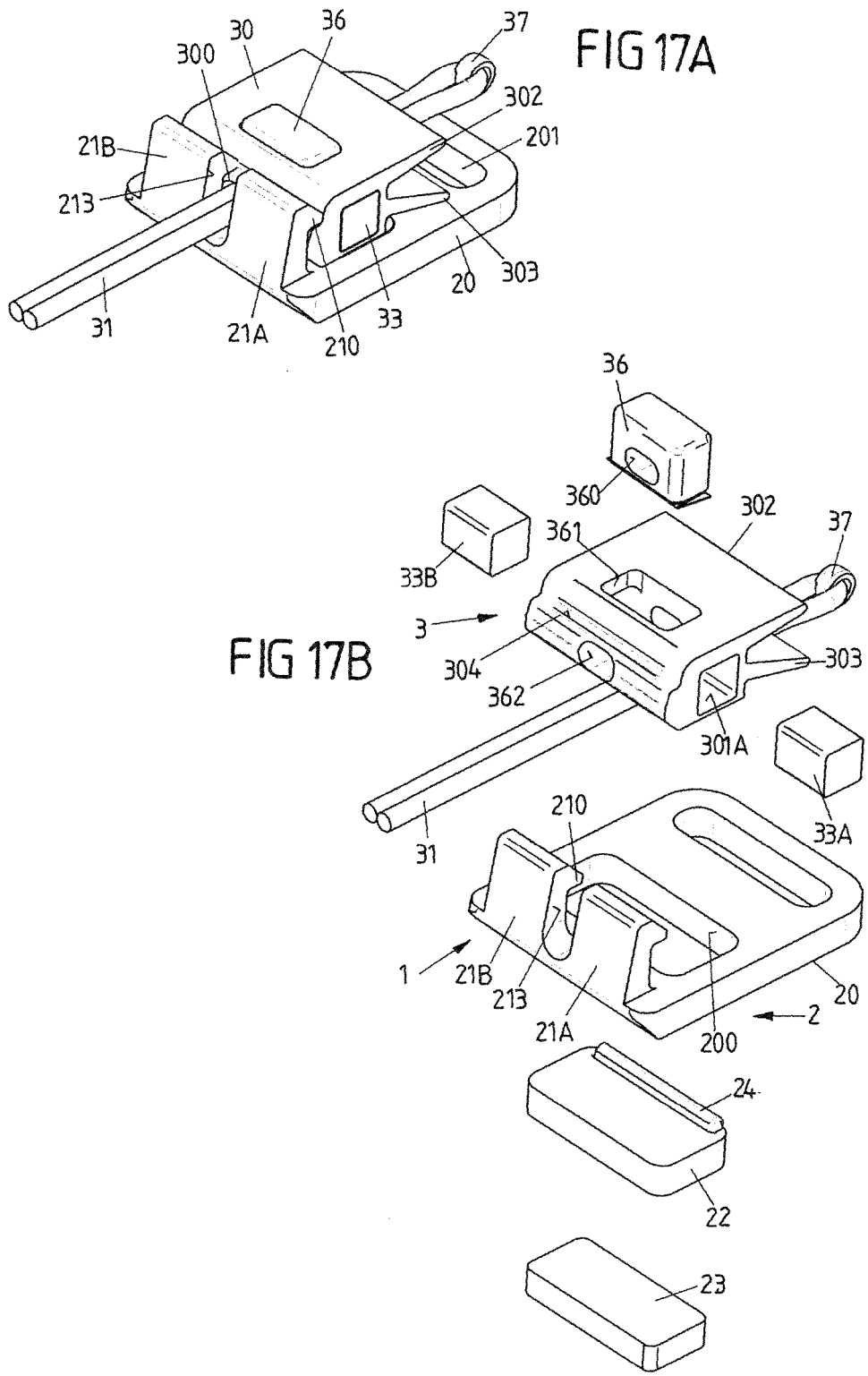

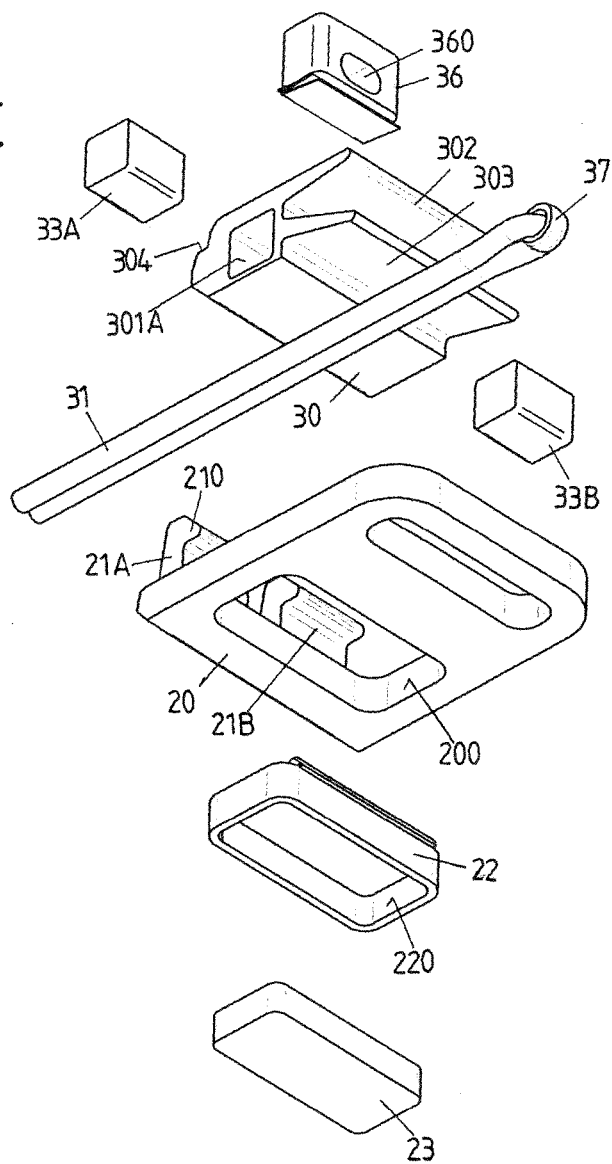
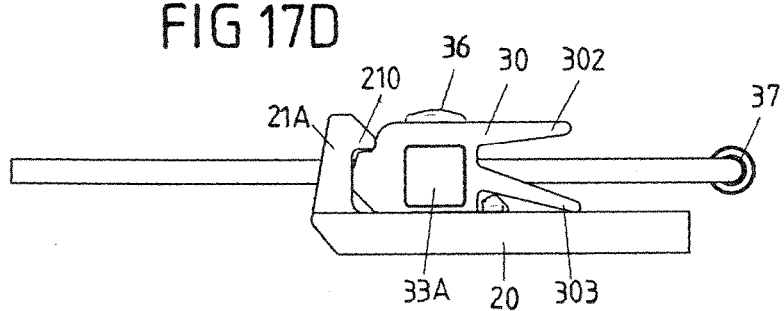

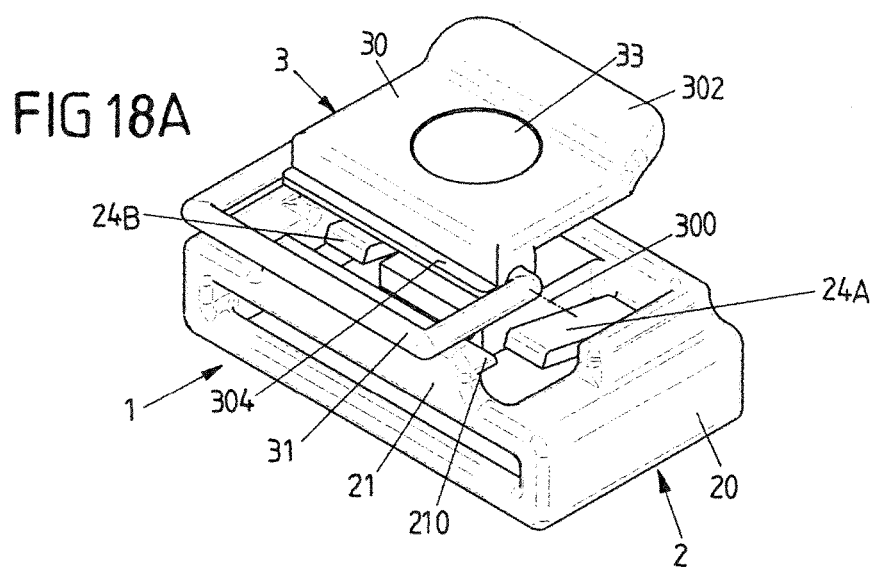
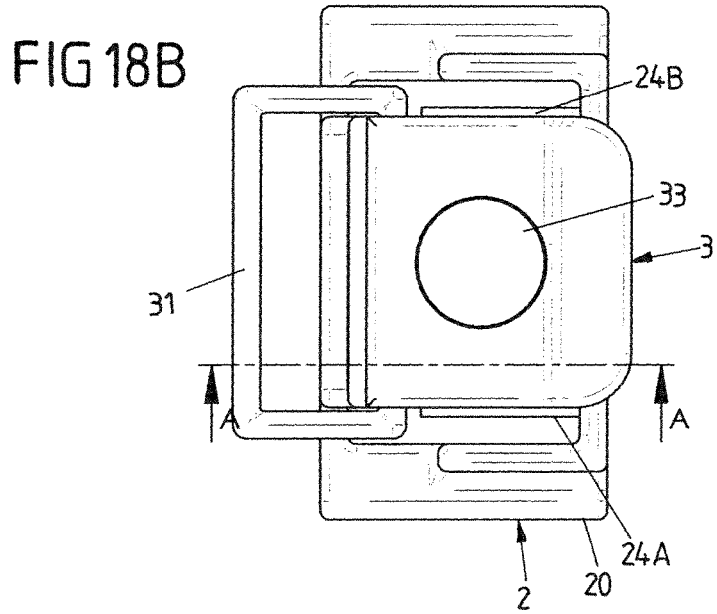
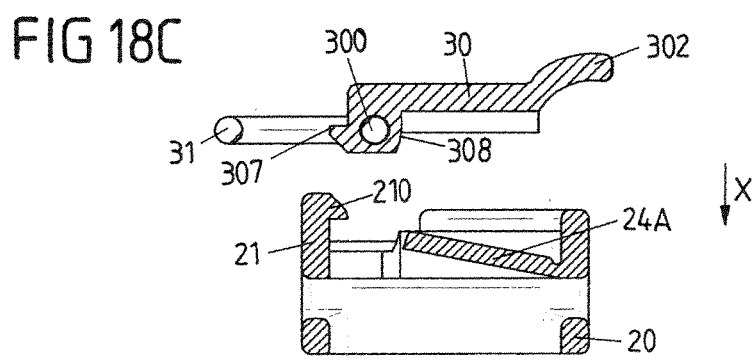

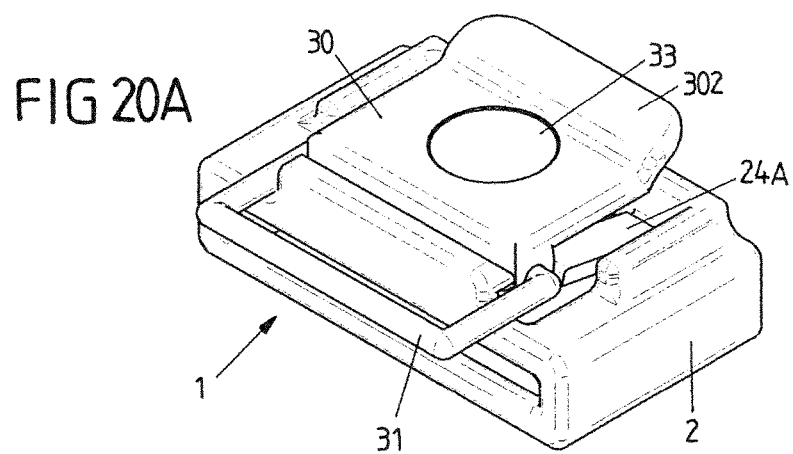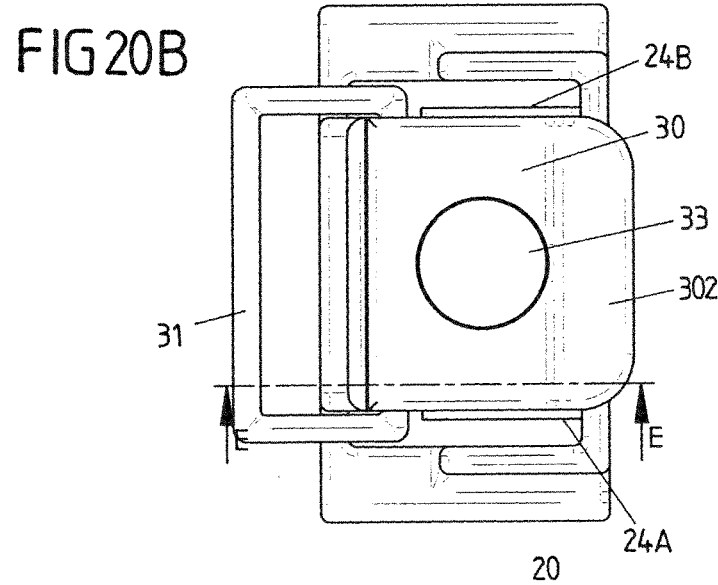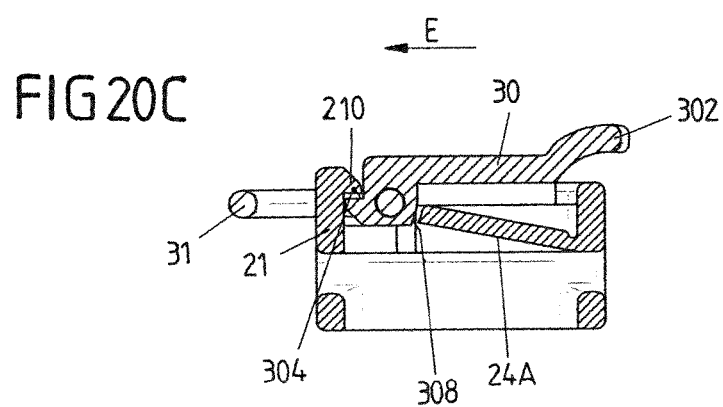

CLOSURE DEVICE

CROSS-REFERENCE TO RELATED APPLICATIONS

This application is the United States national phase of International Application No. PCT/EP2013/060762 filed May 24, 2013, and claims priority to European Patent Application No. 13167140.6 filed May 8, 2013, the disclosures of which are hereby incorporated in their entirety by reference.

BACKGROUND OF THE INVENTION

Field of the Invention

The invention relates to a closure device for releasably connecting two parts with each other.

A closure device of this kind comprises a first closure member having a rigid first locking protrusion and a second closure member having a rigid second locking protrusion. The second closure member is attachable to the first closure member and in a closed position is held on the first closure member such that parts connected with the closure members are connected with each other. For closing the closure device the second locking protrusion can be brought into engagement with the first locking protrusion in an engagement direction and in the closed position then engages the first locking protrusion in a positive locking manner.

The first closure member furthermore comprises a first magnetic member and the second closure member comprises a second magnetic member. The first magnetic member and the second magnetic member are constituted to magnetically attract each other when the second closure member is attached to the first closure member, hence supporting the closing of the closure device by generating an attraction force pulling the closure members into engagement with each other.

DESCRIPTION OF RELATED ART

In a closure device as disclosed in U.S. Pat. No. 5,664,298 two closure members are provided which each comprise a locking protrusion. The locking protrusions can be brought into engagement with each other and, in a closed position of the closure device, are fittingly held together in a positive locking manner. Two magnets are arranged on each closure member to ensure that the closure members cannot be separated from each other in an unintentional manner. The closure device of U.S. Pat. No. 5,664,298 serves as a closure for jewelry and hence is not suited for carrying large loads.

In a closure device as known from US 2003/0229974 A1, also serving as a closure for jewelry, a first closure member can be brought into a positive locking engagement with a second closure member, wherein the engagement is secured, in a closed position of the closure device, by means of magnets.

There is a desire for closure devices which are easy to close, can comfortably be opened and at the same time can provide a high-strength closure which can carry large loads, as it is required for example for safety closures which must not open even if excessive loads act onto the closure.

It is an object of the invention to provide a closure device which can easily and comfortably be handled and at the same time is suitable to take on large loads.

SUMMARY OF THE INVENTION

Accordingly, the closure device comprises a force application element pivotably attached to the second closure member at a force application location in the vicinity of the second locking protrusion, the force application element being constituted to introduce a force into the second closure member.

This originates from the idea to provide a closure device in which a second closure element is of a two-part form. Accordingly, the second closure member is pivotably connected to the force application element which serves to introduce a force into the second closure member when the closure device is subjected to forces in its closed position. Because the force application element acts onto the second closure member at a force application location in the vicinity of the second locking protrusion and hence at that location at which the second closure member engages the first closure member in a positive locking manner, large loads can be taken up by the closure device in a fairly large range of pivoting positions of the force application element relative to the second closure member, such that the risk for an unintentional opening of the closure device under load is reduced.

The force application element may for example be a bracket pivotable about a pivot axis on the second closure member. The pivot axis herein constitutes the force application location and hence assumes the shape of a line.

Just as well, the force application element may be a rope, a chain or a cable pivotable about a pivot point on the second closure member. In this case the pivot point constitutes the force application location, which hence assumes the shape of a single point. The rope, chain or cable may be rigid or flexible.

If a bracket is used, it may form a pivoting joint with the second closure element, wherein the joint may be formed on two sides or on a single side or on a central point of the second closure member. The same applies if the force application element is a rope, chain or cable which also may pivotably be attached to two sides, a single side or a central point of the second closure member.

The pivoting joint, in particular if a bracket is used as force application element being pivotable about a pivot axis, may be opened in a direction perpendicular to the pivot axis such that the bracket may be clipped into an opening forming the joint in order to attach the bracket to the second closure member. Just as well, an opening forming the joint may circumferentially be closed in all directions perpendicular to the pivot axis, such that the bracket may only be attached to the joint by inserting it into a respective opening along the pivot axis.

In particular if the force application element is shaped as a chain, rope or cable, it may be adjustably attached to the second closure member such that it can be adjusted in its length. For this, for example a ring may slidably be arranged on the chain, rope or cable such that by varying the position of the ring on the chain, rope or cable the length of the chain, rope or cable can be adjusted.

In one embodiment, the first closure member comprises a base and a locking element rigidly attached to the base and carrying the first locking protrusion. The second closure member, in turn, comprises a locking part carrying the second locking protrusion and having a front face which in the closed position faces the locking member of the first closure member. The locking element with the first locking protrusion arranged thereon and the base herein beneficially form a U-shaped recess in which the locking part of the second closure member with its second locking protrusion engages in the closed position such that the second closure member with its second locking protrusion is held in a positive locking manner in the U-shaped recess formed by the first locking protrusion, the locking element and the base of the first closure member.

The force application location, i.e. the location at which the force application element engages, herein in one embodiment may be located, in the closed position of the closure device, between the front face of the second closure element and a center of the first magnetic member of the first closure member. The center of the first magnetic member may be determined by a geometric center or a center of mass of a magnet or magnetic armature constituting the first magnetic member. Because the force application location lies in between the front face of the second closure element and the center of the first magnetic member of the first closure member, it is ensured that a beneficial leverage for holding the second closure member in engagement with the first closure member by means of the magnetic attraction force between the magnetic members of the first closure member and the second closure member exists. Because the force application location lies in between the front face and the center of the first magnetic member, a force acting at the force application location will act with a leverage arm which is smaller than the leverage arm of the magnetic attraction force caused by the magnetic members such that a fairly small magnetic attraction force may be sufficient to ensure that the closure members are held in engagement with each other even at fairly large loads acting via the force application element at the force application location on the second closure member.

The first locking protrusion, in a specific embodiment, forms a first leg and the base forms a second leg of the U-shaped recess, the first leg and the second leg extending substantially parallel to each other. The second closure member in this case, in the closed position of the closure device, engages the U-shaped recess with its second locking protrusion, wherein the second locking protrusion in the closed position abuts the first locking protrusion on the inside of the U-shaped recess.

In another embodiment, the first closure member comprises a blocking element which, in the closed position, faces a back face of the second closure member. The back face herein faces in a direction opposite to the engagement direction and lies opposite the front face on the base of the first closure member. The blocking element is constituted to prevent the second locking protrusion from moving out of its engagement with the first locking protrusion in the direction opposite the engagement direction when the closure device is in its closed position. The blocking element hence serves to prevent the second closure member to move out of engagement with the first closure member in a direction opposite the engagement direction such that the second closure member cannot be released without further ado by displacing it against the engagement direction.

The provision of the blocking element may provide for a particularly strong closure device which is suitable to carry large loads as it is for example required for a safety closure such as for a motorbike helmet which must not open even if excessively large loads, vibrating loads or loads from different directions act onto the closure device. By means of the blocking element the risk for the closure device to be opened due to large loads acting onto the force application element attached to the second closure member is substantially reduced because a sliding of the second closure member out of engagement with the first closure member against the engagement direction is prevented.

In a further embodiment, the second closure member may comprise a support element attached to the locking part and extending, in the direction opposite to the engagement direction, beyond the locking part. The support element is constituted to prevent an abutment of the back face with the blocking element prior to the second locking protrusion engaging the first locking protrusion when closing the closure device. When the second closure member is approached to the first closure member for closing the closure device, first the support element comes into abutment with the base of the first closure member and guides the movement of the second closure member relative to the first closure member such that the second locking protrusion can slide into engagement with the first locking protrusion without the blocking element hindering such movement.

The blocking element may be rigidly arranged on the base and may be shaped as a protrusion protruding from the base.

In another embodiment the blocking element however can also be elastically arranged on the base of the first closure member such that it can be deflected when the second closure member is attached to the first closure member for closing the closure device. Upon closing the closure device, the second closure member hence comes into abutment with the blocking element of the first closure member and deflects the blocking element such that the second closure member with its second locking protrusion can slide into engagement with the first locking protrusion of the first closure member. Once the second locking protrusion has reached its engagement position (in which it is in engagement with the first locking protrusion) the elastic blocking element snaps back into its original position in which it then blocks the second closure member from being slid out of its engagement with the first closure member in a direction opposite to the engagement direction.

In another embodiment the first locking protrusion, on a side which in the closed position faces away from the second locking protrusion, may comprise a slanted face. In addition or alternatively, also the second locking protrusion, on a side which in the closed position faces away from the first locking protrusion, may comprise a slanted face. In this way, it may be achieved that the second locking protrusion, when attaching the second closure member to the first closure member in a closing direction perpendicular to the engagement direction and perpendicular to a plane along which the base of the first closure member substantially extends, is guided past the first locking protrusion when closing the closure device in that the slanted faces of the locking protrusions come into contact with each other and the second locking protrusion may slide along the first locking protrusion until it can be moved into engagement with the first locking protrusion.

Herein, due to the second locking protrusion sliding on a slanted face when closing the closure device the second closure element is displaced by a certain distance against the engagement direction in order to be able to move the second locking protrusion past the first locking protrusion until the second locking protrusion can be moved into positive locking engagement with the first locking protrusion.

The closure device may be opened from its closed position in different ways.

First, the second closure member, for opening the closure device, may be pivotable with its second locking protrusion about the first locking protrusion in order to disengage the second locking protrusion from its positive locking engagement with the first locking protrusion.

Second, the second closure member may be displaceable in a direction perpendicular to the engagement direction and parallel to a plane in which the base of the first closure member substantially extends such that, by the displacement movement, the second locking protrusion slides along the first locking protrusion and hence is moved out of engagement with the first locking protrusion.

If the second closure member can be disengaged from the first closure member by pivoting it with respect to the first closure member, in addition it also is conceivable that the closure device may also be opened by displacing the closure members with respect to each other, such that in principle two opening movements are possible. For pivoting the second closure member relative to the first closure member a handle may be provided on the second closure member, which allows actuating the second closure member for pivoting it with its second locking protrusion about the first locking protrusion.

If the closure device shall be opened by means of pivoting the second closure member relative to the first closure member, it also is conceivable that the opening by displacing the second closure member with regard to the first closure member is blocked by means of a force application element in the shape of a bracket acting together with for example a locking element of the first closure member or by means of additional side elements preventing a displacement movement of the second closure member relative to the first closure member in a direction perpendicular to the engagement direction and parallel to the plane of extension of the base of the first closure member.

If the closure device shall be opened by displacing the second closure member by sliding the second locking protrusion along the first locking protrusion, it is conceivable to provide no handle on the second closure member allowing for a pivoting of the second closure member. In this regard it is also conceivable that the displacement movement is only possible after for example the force application element is moved into a position in which it does not block the displacement movement. Also, an additional interlocking element may be provided which must be released prior to displacing the second closure member relative to the first closure member. Or it is conceivable to allow a displacement only in one direction by for example attaching the force application element to the second closure member in a way that an opening displacement movement is possible only in one direction.

The force application element may for example constitute a belt receptacle for fixing a belt to the second closure member. Also, the first closure member may carry a belt receptacle for fixing a belt to the first closure member, such that via the closure device two belts can be connected to each other.

If the force application element is shaped as a bracket comprising two ends via which the force application element is pivotably attached to at least one opening of the second closure member, it in addition is possible to secure the attachment of the force application element to the second closure member by means of a securing element arranged on the bracket. The securing element holds the bracket together in that its two ends cannot be displaced with respect to each other such that it is prevented that the ends can be detached from the at least one opening of the second closure member. Such bracket together with the securing element may also form a belt receptacle for attaching a belt to the force application element, wherein the securing element serves a first purpose in that it secures the attachment of the bracket to the second closure member and a second purpose in that it holds and secures a belt on the bracket.

The magnetic members may be arranged to generate an attractive force along the engagement direction or in a direction perpendicular to the engagement direction. In the first case the closure members are attracted such that they are pulled towards each other along the engagement direction. In the second case, the magnetic attraction force acts perpendicularly for example to a plane of extension of the base of the first closure member. In the first case magnets of the closure members or a magnet of one of the closure members and a magnetic armature of the other of the closure members face each other along the engagement direction. In the second case magnets of the closure members or a magnet of one of the closure members and a magnetic armature of the other of the closure members face each other in a direction perpendicular to the engagement direction.

On one or on each of the closure members multiple magnets facing the other closure member with opposite poles may be arranged. By such a magnet arrangement it can be ensured that the closure members are attached in the right orientation to each other when closing the closure device in that the magnets interact to move the closure members with respect to each other such that they face each other in a desired manner.

In a further embodiment, a magnetic field sensor may be provided on one of the closure members for sensing, in the closed position, a magnetic field produced by the magnetic members. Herein, the magnetic field sensor may detect the strength of the magnetic fields produced by the magnetic members. Or the magnetic field sensor may detect the position of one or both magnetic members of the closure members, for example the position of the magnetic member of the second closure member. By means of the magnetic field sensor a signal may be produced which indicates to a user if the closed position has been reached and whether it has been established in a correct manner such that a user receives a feedback about the closing of the closure device.

The object is furthermore achieved by a closure device for releasably connecting two parts with each other, comprising:
a first closure member having a rigid first locking protrusion and
a second closure member which is attachable to the first closure member and in a closed position is held on the first closure member, the second closure member having a rigid second locking protrusion, wherein the second locking protrusion can be brought into engagement with the first locking protrusion in an engagement direction and in the closed position engages the first locking protrusion in a positive locking manner,
wherein the first closure member comprises a first magnetic member and the second closure member comprises a second magnetic member, the first magnetic member and the second magnetic member being constituted to magnetically attract each other when the second closure member is attached to the first closure member for closing the closure device.

Herein, the first closure member comprises a blocking element, wherein the blocking element in the closed position faces a back face of the second closure member facing in a direction opposite to the engagement direction, the blocking element being constituted to prevent the second locking protrusion to move out of its engagement with the first locking protrusion in the direction opposite the engagement direction when the closure device is in its closed position.

For such a closure device the advantages and advantageous embodiments described above equally apply such that the closure device may be combined with any of the features described above.

Beyond the embodiments described above the closure device may however have a force application element which can pivotably or rigidly be attached to the second closure member at a force application location. Hence, the closure device may also carry a force application element rigidly attached to the second closure member.

For all of the above it applies that no elastic parts need to be provided for the locking protrusions. This makes it possible to produce the first closure member and the second closure member as metallic parts, for example by means of extrusion profiles. Such extrusion profiles, from metal or plastics, may in an easy and cost efficient manner be fabricated yielding reliable, high-strength parts. Due to the easy structural build of the closure device the closure device in addition is not prone to dirt and hence provides a reliable closure which is suited for a large range of different uses and applications, for example closures for holsters, dog collars or other collars or leashes, helmet closures, closures for orthoses or prostheses, and closures for doors, cases, musical instrument cases, bags, (water-tight) containers such as dry bags.

BRIEF DESCRIPTION OF THE DRAWINGS

The idea underlying the invention shall subsequently be described in more detail with regard to the embodiments shown in the figures. Herein:

FIGS. 1A, 1B show perspective explosive views of a first embodiment of a closure device;

FIGS. 2A-7A show perspective views of the closure device in different positions;

FIGS. 2B-7B show a top view of the closure device in the states according to FIGS. 2A to 7A;

FIGS. 2C-7C show sectional views along lines A-A to F-F according to FIGS. 2B to 7B;

FIGS. 9A, 9B show perspective explosive views of another embodiment of a closure device;

FIGS. 13A-15A show perspective views of another embodiment of a closure device in different positions;

FIGS. 13B-15B show top views of the closure device in the different positions of FIGS. 13A to 15A;

FIGS. 13C-15C show sectional views of the closure device along lines A-A, B-B and E-E according to FIGS. 13B to 15B;

FIGS. 16A, 16B show partially explosive perspective views of another embodiment of the closure device;

FIG. 16C shows a side view of the closure device in its closed position;

FIG. 17A shows a perspective view of another embodiment of the closure device;

FIGS. 17B, 17C show perspective explosive views of the closure device;

FIG. 17D shows a side view of the closure device;

FIGS. 18A-21A show perspective views of another embodiment of a closure device in different positions;

FIGS. 18B-21B show top views of the closure device;

FIGS. 18C-21C show sectional views along lines A-A, C-C, E-E and D-D according to FIGS. 18B to 21B;

DETAILED DESCRIPTION OF THE INVENTION

Figure 1A:
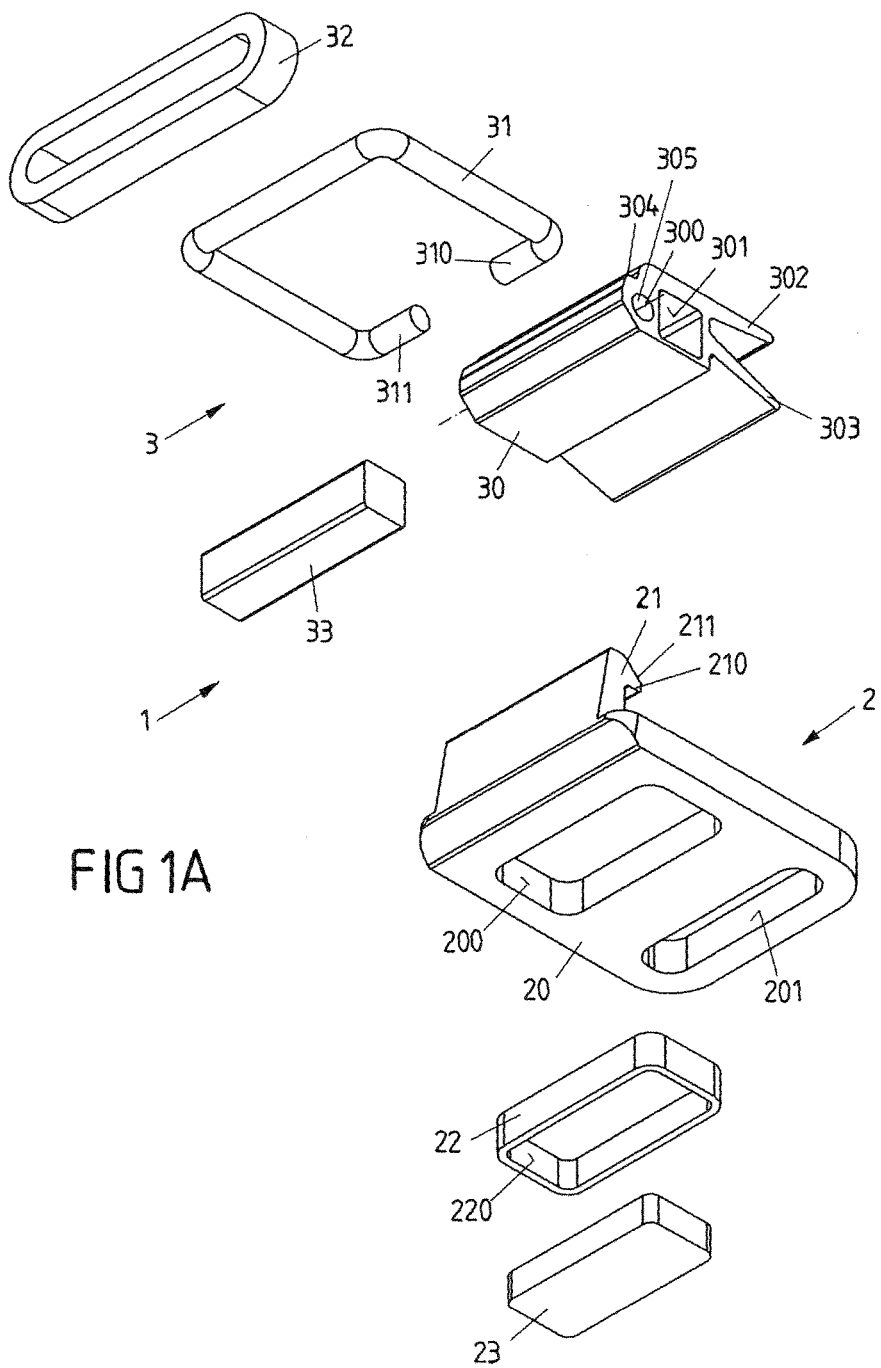

According to FIGS. 1A, 1B to FIGS. 7A to 7C subsequently a first embodiment of a closure device 1 shall be explained comprising a first closure member 2 and a second closure member 3.

Herein, the first closure member 2 comprises a base 20 carrying a locking element 21 with a locking protrusion 210. The locking element 21 is rigidly attached to the base 20, extends from the base 20 and carries the rigid locking protrusion 210. The base 20 and the locking element 21 with the locking protrusion 210 may beneficially be formed in one piece from plastics or metal.

The base 20 comprises an opening 200 into which a magnet housing 22 receiving, in a reception opening 220, a magnetic member 23 in the shape of a magnet or a magnetic armature is inserted such that the magnetic member 23 is fixedly held on the base 20. The base 20 furthermore has a belt receptacle 201 to which a belt can be attached.

A second closure member 3 comprises a locking part 30 carrying a locking protrusion 304 and having a longitudinally extended opening 300 for attaching a force application element 31 in the shape of a bracket to the locking part 30. The locking part 30 furthermore has a central opening 301 into which a magnetic member 33 in the shape of a magnet or a magnetic armature can be inserted such that the magnetic member 33 is fixedly held on the locking part 30.

From the locking part 30 a handle 302 and a support element 303 extend. The handle 302 serves to actuate the locking part 30 for opening the closure device 1 from a closed position. The support element 303 serves to ensure that the locking part 30 can be attached to the first closure member 2 in an easy, comfortable, reliable way, as shall be explained subsequently in more detail.

Attached to the force application element 31 in the shape of the bracket is a securing element 32 which reaches around the bracket 31 in a state in which it is attached to the bracket 31. The securing element 32 together with the bracket 31 serves as a belt receptacle for attaching a belt to the second closure member 3. Furthermore, the securing element 32 serves to secure the bracket 31 on the locking part 30 after the bracket 31 has been attached to the locking part 30 by inserting its two ends 310, 311 into the longitudinal opening 305 of the locking part 30.

The force application element 31 in the shape of the bracket is, when it is attached to the locking part 30, pivotable relative to the locking part 30 around a longitudinal axis 300. The longitudinal axis 300 in this case forms a force application location in that along this axis 300 forces acting onto the force application element 31 are inserted into the locking part 30.

Figure 6A:
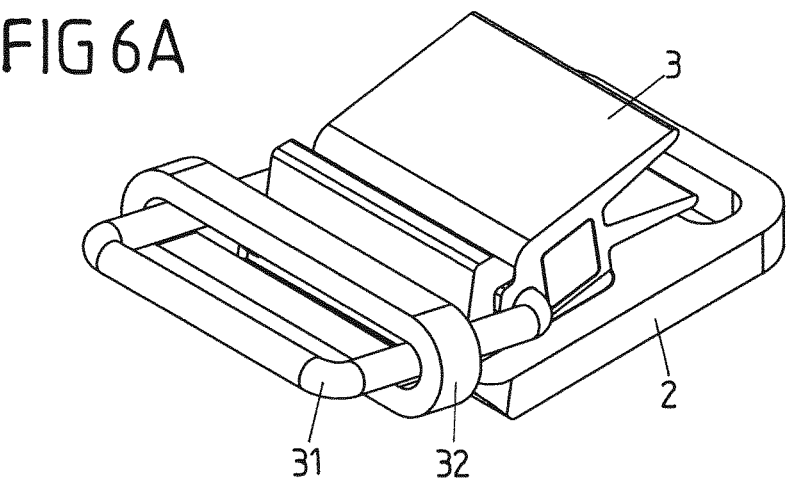
Figure 6B:
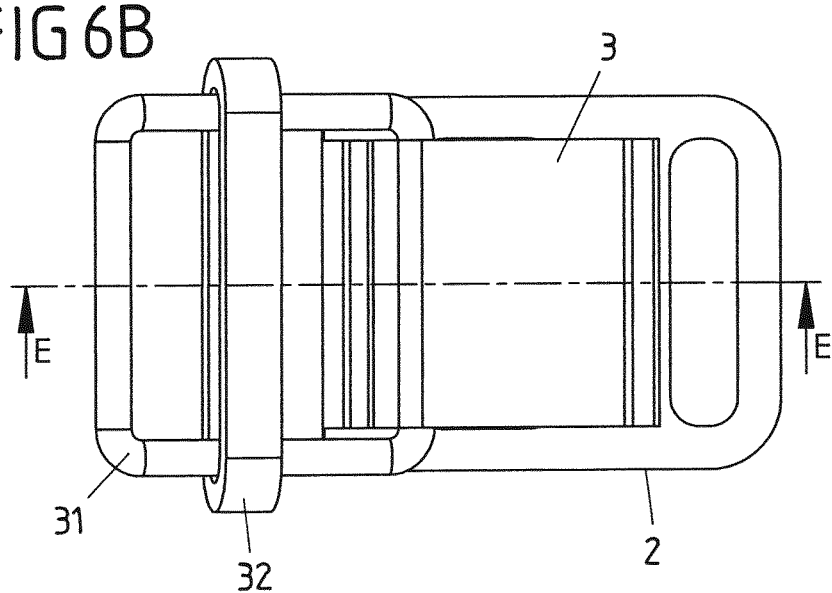
Figure 6C:
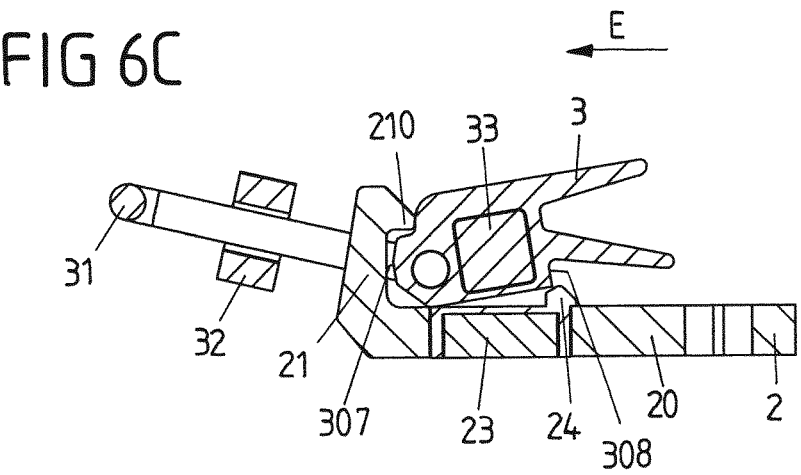
Figure 7A:
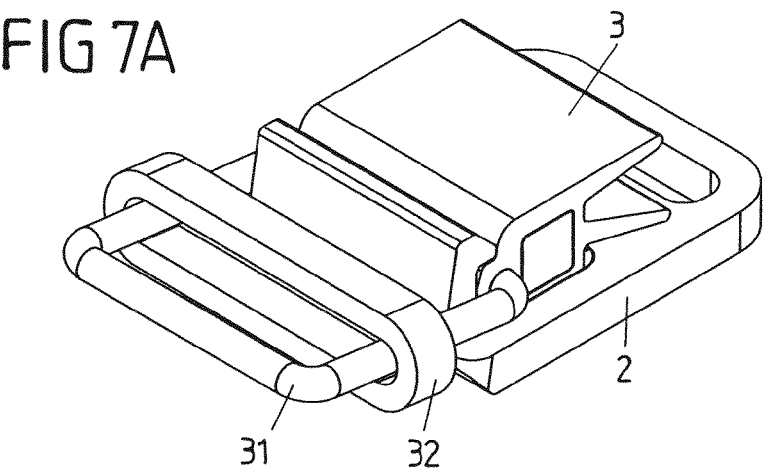

FIGS. 2A to 2C to 7A to 7C show the closure device 1 in different positions. Herein, FIGS. 2A to 7A show the closure device 1 in perspective views in an open state (FIG. 2A), during the closing of the closure device 1 (FIGS. 3A to 6A)

and in a closed position (FIG. 7A). FIGS. 2B to 7B show corresponding top views, and FIGS. 2C to 7C show corresponding sectional views.

Figure 2A:
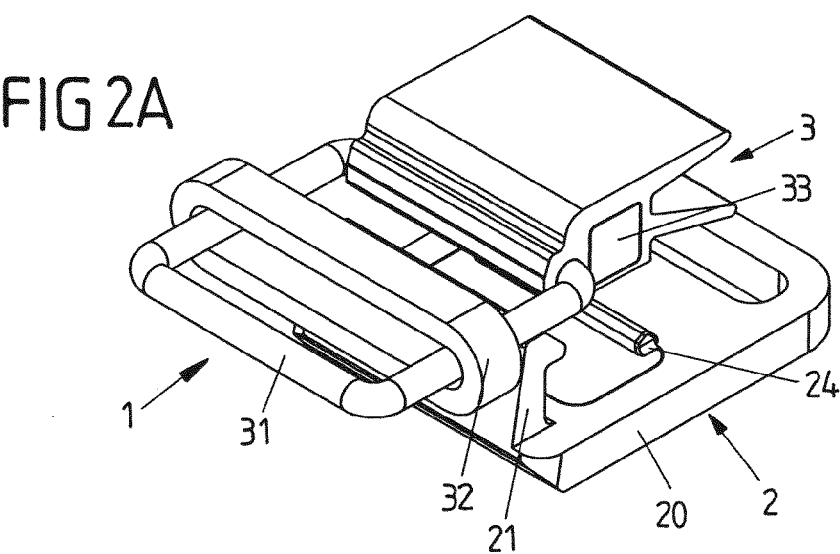
Figure 2B:
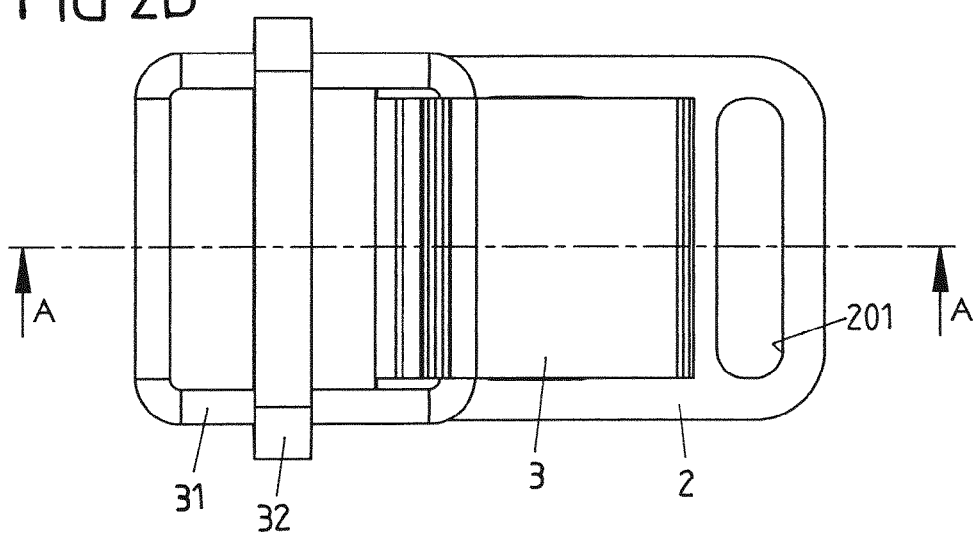
Figure 2C:
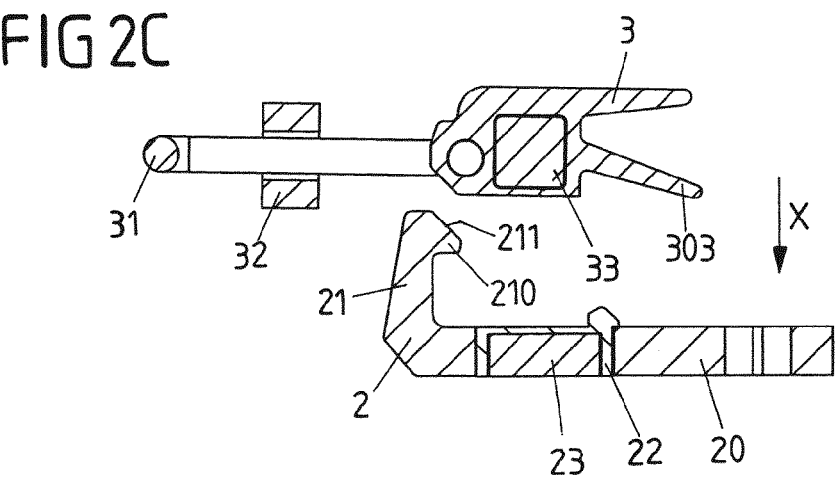

In an opened position, prior to closing, the closure members 2, 3 are separated from each other and may be attached to each other by approaching the second closure member 3 to the first closure member 2 in a closing direction X, which is substantially perpendicular to the base 20 of the first closure member 2 (see FIG. 2C).

When closing the closure device 1, as shown in FIG. 3C, the second closure member 3 approaches the first closure member 2 in the closing direction X, wherein the magnetic members 23, 33 of the closure members 2, 3 generate a magnetic attraction force supporting the approaching movement of the closure members 2, 3 such that the closure members 2, 3 are magnetically pulled together and the closing movement is magnetically supported. When the second closure member 3 approaches the first closure member 2, it comes, via a tilted face 306 on the locking part 30, into contact with a tilted face 211 of the lock protrusion 210 of the first closure member 2. The tilted face 306 is arranged on a front end of the locking part 30 at a position opposite to the locking protrusion 304 of the locking part 30.

Figure 4A:
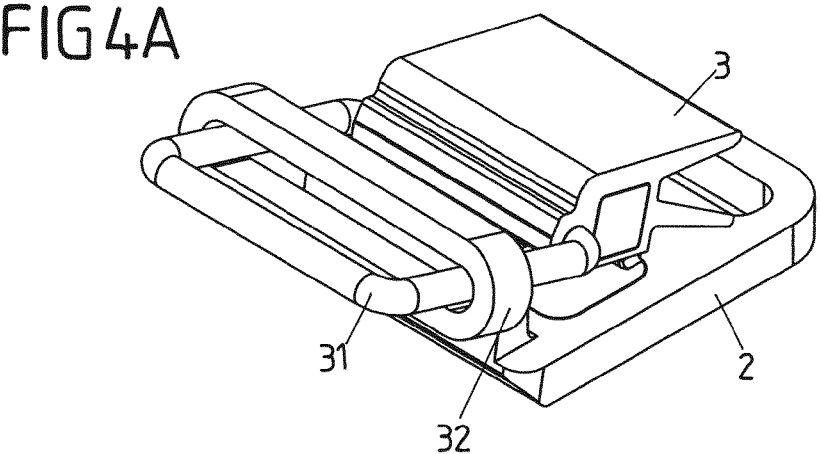
Figure 4B:
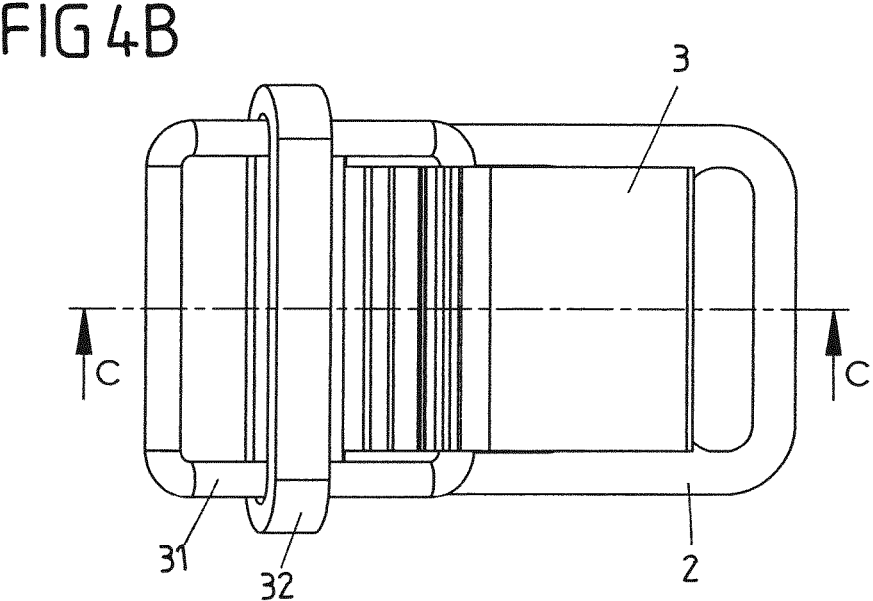
Figure 4C:
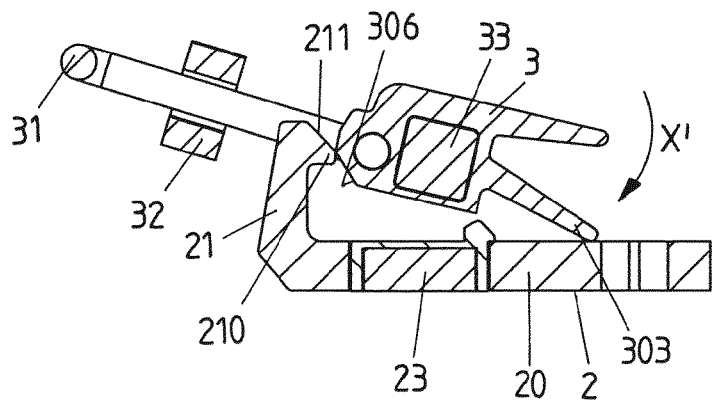

When the second closure member 3 further approaches the first closure member 2, as it is shown in FIG. 4C, the tilted face 306 slides along the tilted face 211 on the locking protrusion 210. The locking part 30 hence is moved past the locking protrusion 210.

Figure 5A:
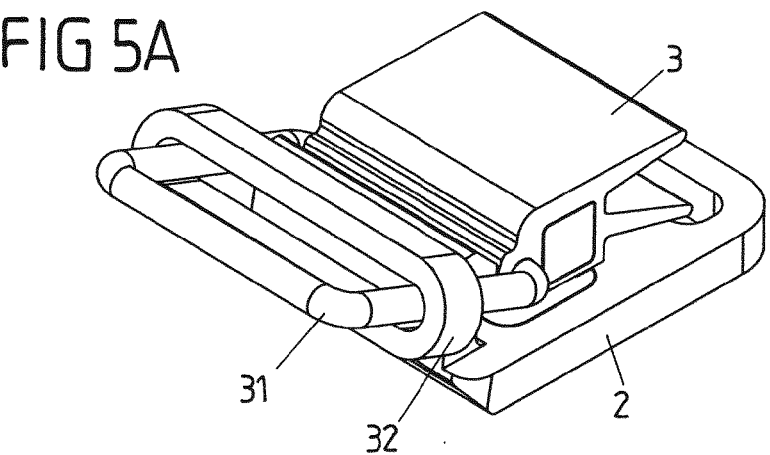
Figure 5B:
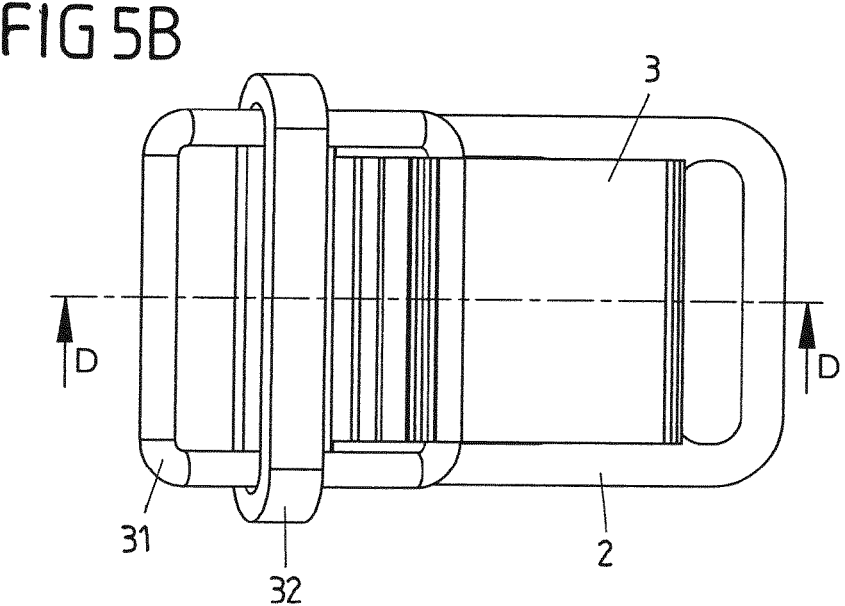
Figure 5C:
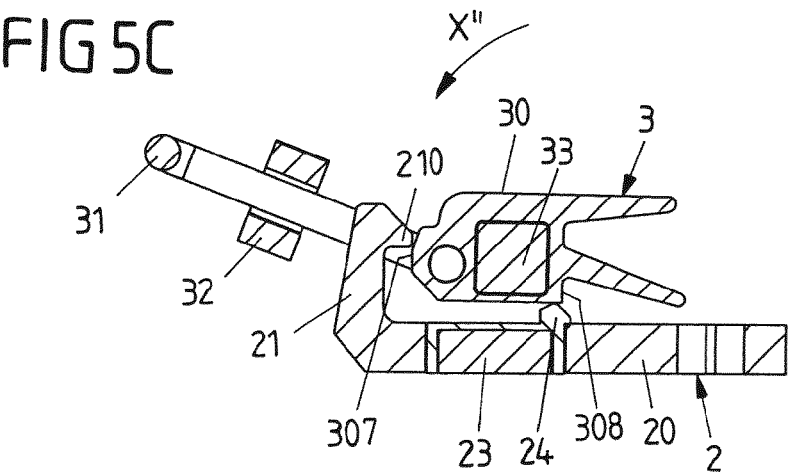

As the magnetic members 23, 33 attract each other at increasing strength the first closure member 3 may pivot such that the support member 303 approaches the base 20 of the first closure member 2 (tilting direction X') and comes into abutment with the base 20. Because the support element 303 comes into abutment with the base 20 and hence supports the locking part 30 on the base 20, the further approaching movement of the first closure member 3 is guided by the support element 303 slidingly moving with its far end along the base 20. This in particular prevents that a back face 308 of the locking part 30 (see FIG. 5C) can come into contact with a blocking element 24 arranged on the base 20 prior to a front face 307 of the locking part having been moved past the locking protrusion 210 of the first closure member, as is shown in FIG. 5C. In this way, it is prevented that the second closure member 3 can be jammed with its locking part 30 in a position which may prohibit the second closure member 3 to reach its closed position. Rather, as shown in FIG. 5C, the locking part 30 with its front face 307 is guided past the locking protrusion 210 of the locking element 21 of the first closure member, such that the second closure member 3 reaches the position shown in FIG. 6C.

In the position of FIG. 6C the locking part 30 with its locking protrusion 304 engages the locking protrusion 210 of the first closure member 2 in that the locking part 30 with its front face 307 has been moved into a U-shaped recess formed by the locking element 21, the locking protrusion 210 and the base 20. The locking part 30 herein has been moved into an engagement direction E into engagement with the U-shaped recess, wherein during the further closing movement and supported by the magnetic attraction between the magnet members 23, 33 the closure device 1 reaches its closed position shown in FIG. 7C in which the front face 307 faces the locking element 21 and the back face 308 faces the blocking element 24 on the base 20 of the first closure member 2.

Because the locking protrusions 210, 304 are rigidly arranged on the first closure member 2 respectively the second closure member 3, the closing movement is not a simple longitudinal movement, but involves different movements. In particular, the closure members 2, 3 for example in a first phase are approached to each other along a substantially linear closing direction X (see FIG. 2A). The second closure member 3 then however is tilted in a tilting direction X' (see FIG. 4C) in a first tilting orientation and then is tilted back in a tilting direction X" in a second tilting orientation (FIG. 5C) to reach the closed position of FIG. 7C.

In the closed position the second closure member 3 is held on the first closure member 2 in that the locking part 30 of the second closure member 3 is in a positive locking engagement with the locking element 21 carrying the locking protrusion 210 of the first closure member 2. The closure members 2, 3 herein furthermore are held on each other by means of the magnetic members 23, 33 such that an unintentional opening of the closure device 1 is prevented.

Because the force application element 31 in the shape of the bracket is attached to the locking part 30 of the second closure member 3 at the force application location 300 (see FIG. 7C), furthermore a not intended opening due to a large load acting onto the second closure member 3 is effectively prevented. Because the force application location 300 (which corresponds to the pivoting line of the force application element 31 in the shape of the bracket)—viewed along the engagement direction E—lies in between the front face 307 of the locking part 30 and a center 230 of the magnetic member 23 of the first closure member 2, forces introduced into the locking part 30 by means of the force application element 31 will, with a force component acting against the closing direction X, have a small leverage arm compared to the leverage arm of the magnetic attraction forces acting between the magnetic members 23, 33 such that even at large loads an opening of the closure device 1 by means of the loads are prevented.

Furthermore, because a displacement movement of the closure member 3 against the engagement direction E is prevented by means of the blocking element 24 rigidly arranged on the base 20 of the first closure member 2, loads can be introduced in virtually any direction into the second closure member 3 via the force application element 31 without the closure device 1 being opened due to the action of the loads. If loads for example act onto the second closure member 3 substantially in a direction against the engagement direction E, the locking part 30 with its back face 308 will come into abutment with the blocking element 24, such that the locking part 30 cannot be moved out of engagement from the locking element 21.

As a result, a high-strength closure device 1 is provided which in particular is suitable for example as a safety closure being capable of withstanding large loads. Furthermore, due to the simple construction of the closure device 1 the closure device 1 is easy to handle, reliable and not prone to dirt, making the closure device 1 suitable for a large variety of different applications in various environments under various conditions.

Figure 7B:
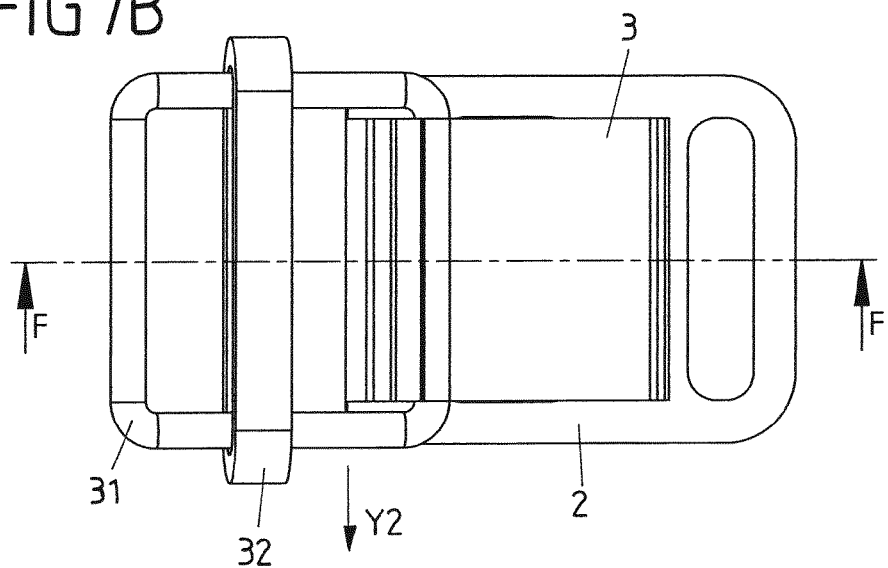
Figure 7C:
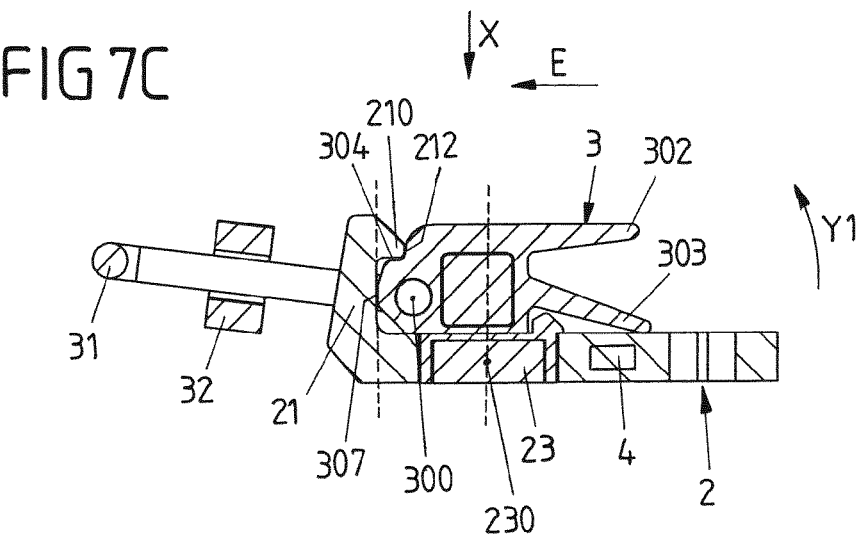

As shown in FIG. 7C, a magnetic field sensor 4 may be provided for example on the first closure member 2 (but just as well also on the second closure member 3) in order to obtain a feedback about the closure device 1 having reached its closed position. The magnetic field sensor 4 may for example be capable to sense the magnetic field strength of the magnet arrangement 23, 33 such that from the magnetic fields in the closed position of the closure device 1 it may be derived whether the closure device 1 correctly has reached its closed position or not. This may be indicated to a user for example by means of a light or an acoustic tone or in any other suitable manner.

For opening the closure device 1 a user may act on the handle 302 of the locking part 30 and may pivot the second closure member 3 in an opening direction Y1, as shown in FIG. 7C, in order to tilt the second closure member 3 and to bring it out of its locking relation with the blocking element 24. By tilting the second closure member 3 in that way, the magnetic members 23, 33 are removed from each other and the locking part 30 is tilted out of its engagement with the locking element 21, such that the second closure member 3 can be separated from the first closure member 2.

The handle 302 serves also as lever arm to allow an easy, smooth separation of the magnetic members 23, 33.

For an easy tilting movement the locking part 30 herein is rounded at a front edge facing the outer edge 212 of the locking protrusion 210 such that the locking part 30 with its rounded front edge can be slid past the outer edge 212 of the locking protrusion 210 when tilting the second closure member 3 for opening the closure device 1.

Furthermore, the closure device 1 may be opened by slidingly moving the second closure member 3 in an opening direction Y2, as this is indicated in FIG. 7B. For this, the force application element 31 in the shape of the bracket must be brought into a position in which it does not reach around the locking element 21, such that the second closure member 3 freely can be slid with its locking protrusion 304 along the locking protrusion 210 of the first closure member 2 until the second closure member 3 has come out of its engagement with the first closure member 2.

The locking part 30 of the second closure member 3 and the first closure member 2 may be manufactured from plastic or metal for example by extrusion. Such parts may in an easy manner be produced from extrusion profiles such that the fabrication is easy and cost effective.

Figure 8A:
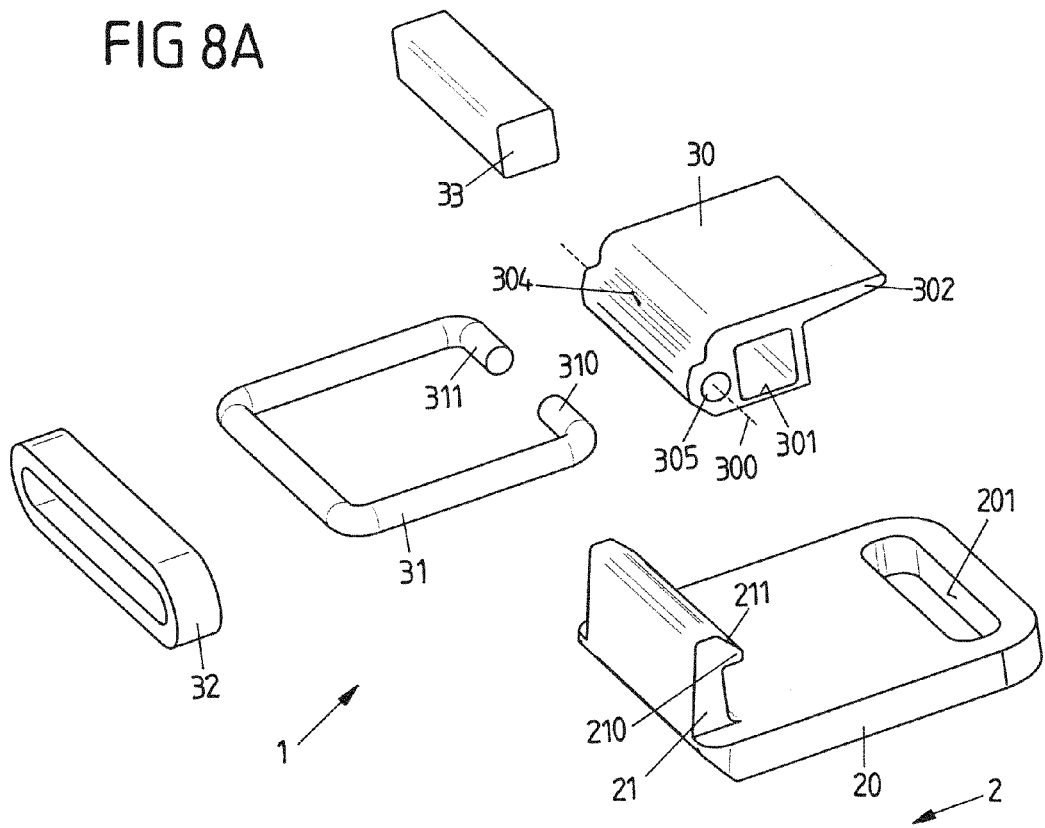
FIG. 8A shows a perspective explosive view of a second embodiment of a closure device.
Figure 8B:
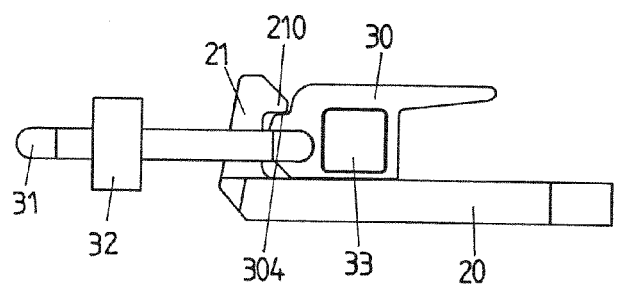
FIG. 8B shows a side view in a closed position of the closure device of FIG. 8A.

In a modification of the previously described embodiment the force application element 31 in the shape of the bracket may also be rigidly attached to the locking part 30. In another embodiment shown in FIGS. 8A, 8B, no blocking element 24 on the base 20 of the first closure member 2 is provided. Accordingly, the locking part 30 of the second closure member 3—in comparison to the previously described embodiment—does not have to comprise a support element 303 for preventing the second closure element 3 from becoming jammed in between the blocking element 24 and the locking protrusion 210 when closing the closure device 1. Other than that the embodiment of FIGS. 8A, 8B is identical to the previously described embodiment, such that it also shall be referred to the above.

Figure 9C:
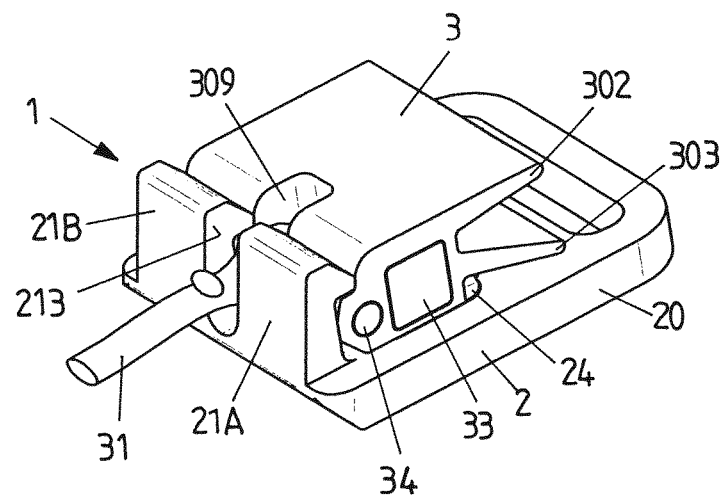
FIG. 9C shows a perspective view of the closure device in a closed position.
Figure 9D:
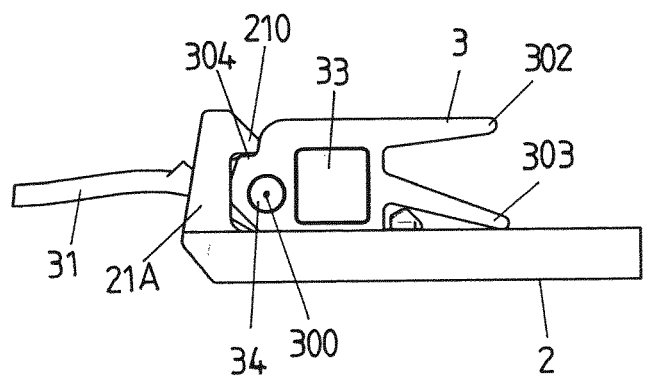
FIG. 9D shows a side view of the closure device.
Figure 10A:
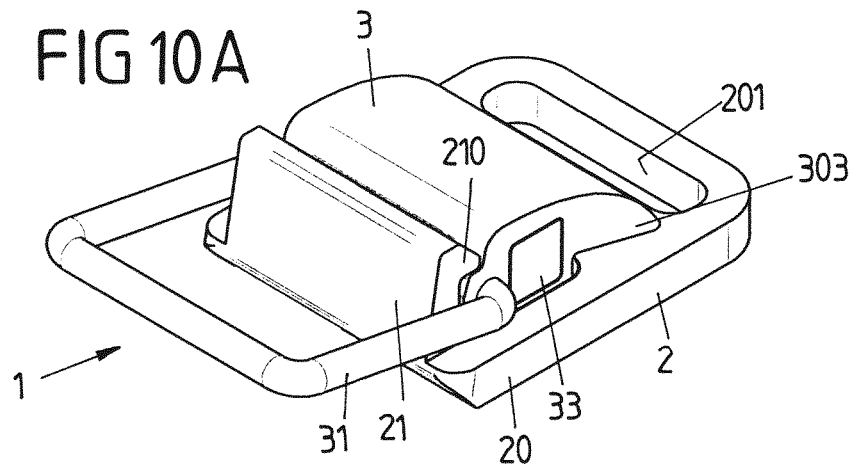
FIGS. 10A, 11A show perspective views of another embodiment of a closure device in different positions.
Figure 10B:
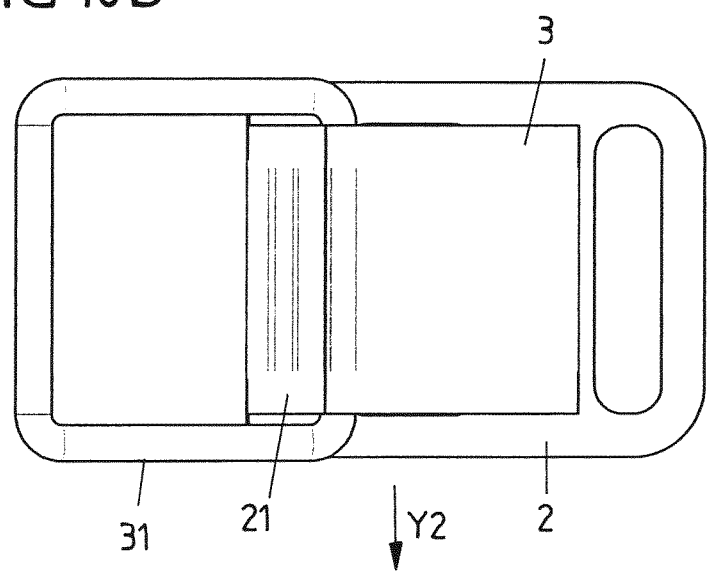
FIGS. 10B, 11B show top views of the closure device.
Figure 10C:
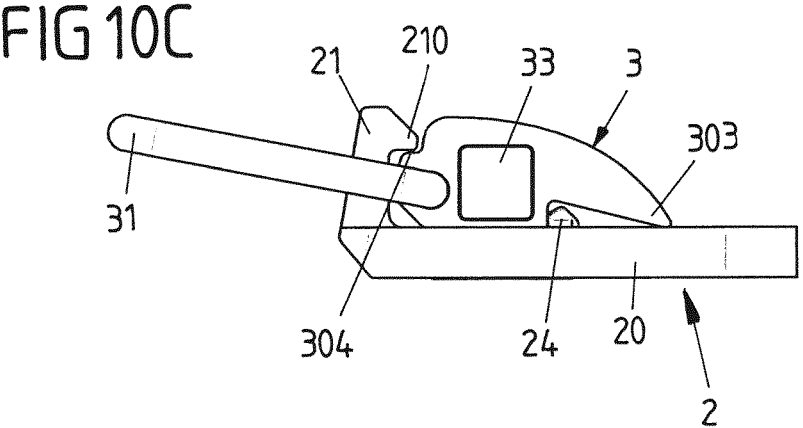
FIGS. 10c, 11C show side views of the closure device.

In the embodiment of FIGS. 9A to 9D, a force application element 31 is provided in the shape of a wire, rope, chain, belt or the like which via an axis 34 is attached to the locking part 30 of the second closure member 3. The axis 34 herein is inserted into openings 305A, 305B of the locking part 30, wherein the force application element 31 is attached to the axis 34 at a location of a recess 340 on the locking part 30. In the closed position of the closure device 1 the force application element 31 reaches through the recess 340 of the locking part 30 and a recess 213 of the locking element 21 of the first closure member 3, as this is shown in FIG. 9C.

In the embodiment of FIGS. 9A to 9D, hence, the force application element 31 is pivotably attached to the locking part 30 via the axis 34. The force application element 31 hence acts onto a central point of the axis 34, via which forces are introduced into the locking part 30.

Due to the recess 340 being formed in the locking part 30, two magnetic members 33A, 33B are provided on the locking part 30, each received in an opening 301A, 301B in the locking part 30.

Other than that the functionality of the closure device 1 is similar to the embodiment of FIGS. 1A, 1B to 7A to 7C, such that it also shall be referred to the above description.

The embodiment of FIGS. 10A to 100 and 11A to 110 is identical to the embodiment of FIGS. 1A, 1B to 7A to 7C, except for the only difference that in the embodiment of FIGS. 10A to 100, 11A to 110 no handle (having the reference numeral 302 in the embodiment of FIGS. 1A, 1B to 7A to 7C) is provided on the locking part 30. Hence, a user cannot easily grab the locking part 30 for pivoting it in order to open the closure devise 1.

Rather, the preferred opening motion for opening the closure device 1 is a linear displacement movement in the opening direction Y2 or against the opening direction Y2.

Figure 11A:
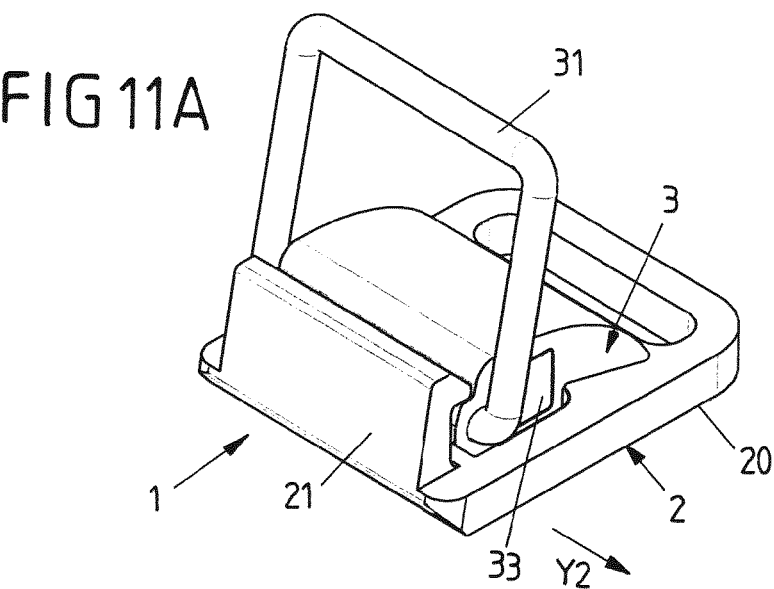
Figure 11B:
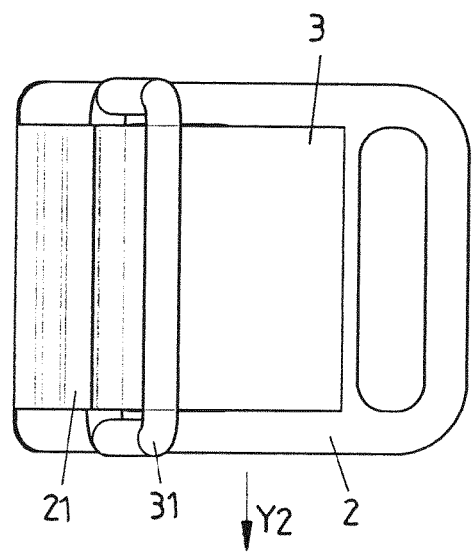
Figure 11C:
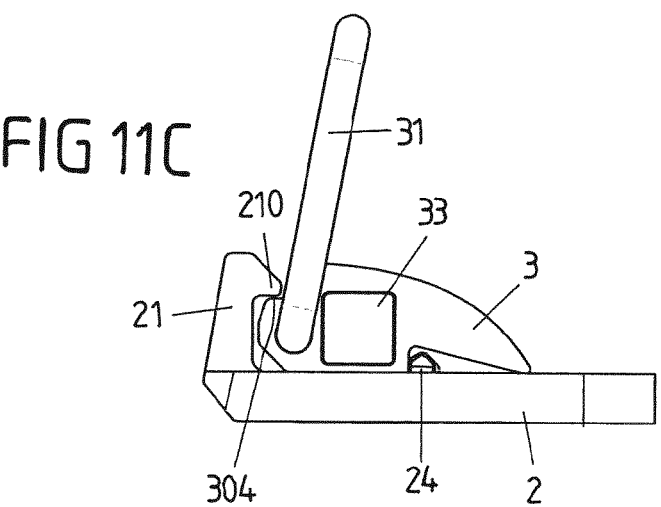

The opening herein is only possible after the force application element 32 in the shape of the bracket has being brought into the position indicated in FIGS. 11A to 11C, such that a sliding movement of the second closure member 3 in or against the opening direction Y2 is not hindered by the force application element 31 interfering with the locking element 21.

Figure 12A:
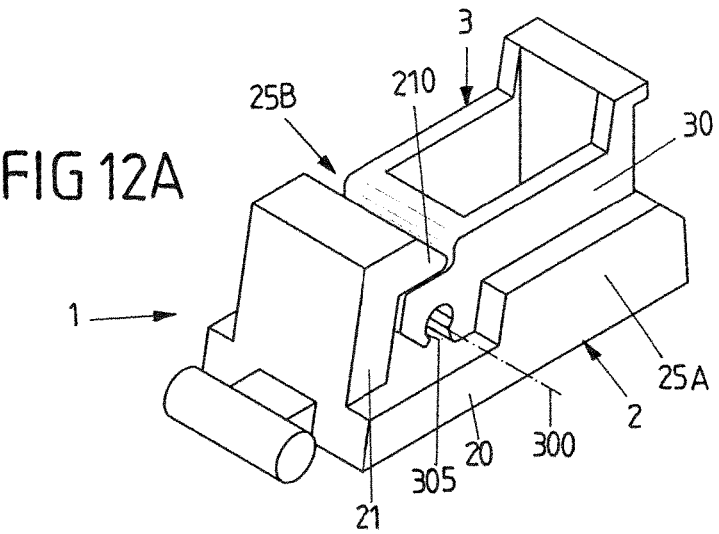
FIG. 12A shows a perspective view of another embodiment of a closure device.
Figure 12B:
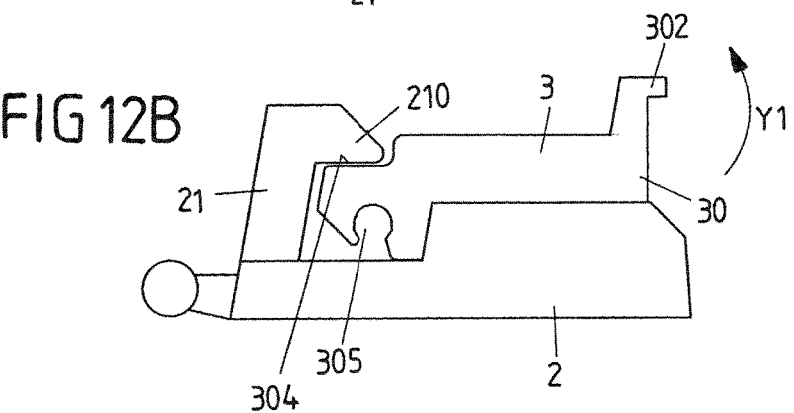
FIG. 12B shows a side view of the closure device.
Figure 12C:
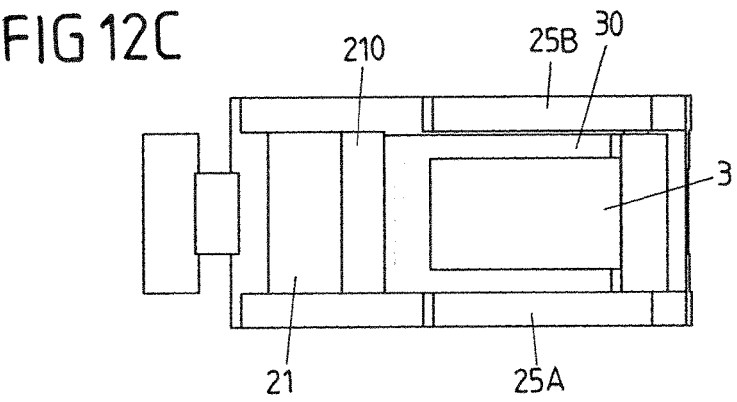
FIG. 12C shows a top view of the closure device.

In the embodiment of FIGS. 12A to 12C a force application element (not shown in FIGS. 12A to 12C) can be inserted into an opening 305 which circumferentially is open such that the force application element may be clipped into the opening 305 from a direction perpendicular to the line 300 forming the pivoting axis of the force application element.

Furthermore, side elements 25A, 25B are provided on the base 20 of the first closure member 2. Such side elements 25A, 25B, in the closed position of the closure device 1, receive the second closure member 3 in between them and hence prevent a sideways movement of the second closure member 3 with respect to the base 20 of the first closure member 2. Hence, the closure device 1 may only be opened by pivoting the second closure member 3 in an opening direction Y1 corresponding to a tilting movement, as indicated in FIG. 12B.

Other than such differences the basic functionality of the closing device 1 again is similar to the embodiment of FIGS. 1A, 1B to 7A to 7C, such that it shall be referred to the above.

Figure 15A:
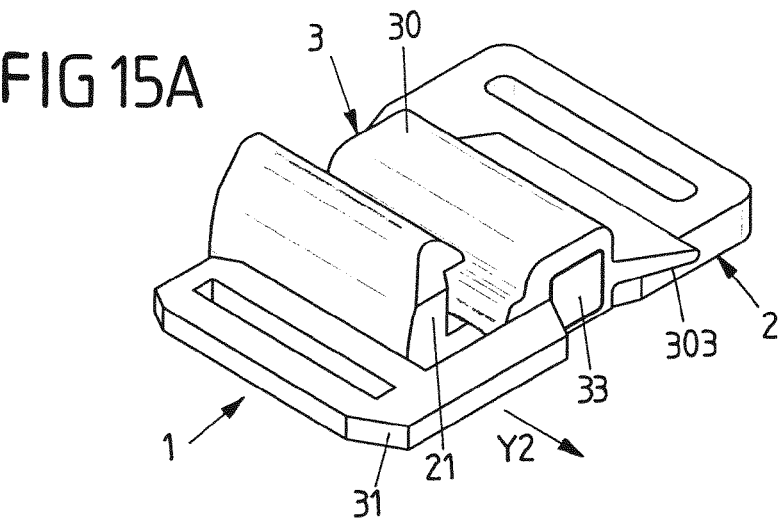
Figure 15B:
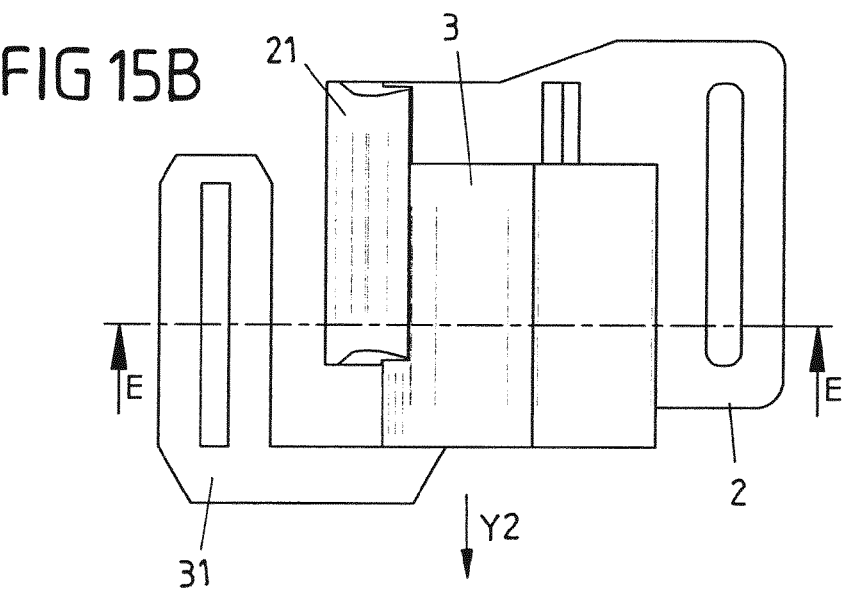
Figure 15C:
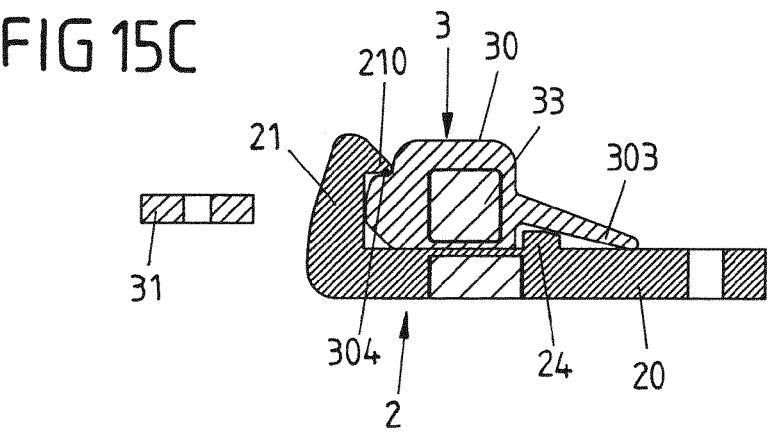

In the embodiment of FIGS. 13A to 13C to 15*a* to 15C a force application element 31 is rigidly attached to the locking part 30 at one of its sides. The force application element 31 hence reaches, with an arm 312, around the locking element 21 in a closed position (see FIGS. 14A to 14C) on one side of the locking element 21. The closure device 1 accordingly may be opened by moving the second closure member 3 in an opening direction Y2, as it is shown in FIGS. 15A to 15C by sliding the locking part 30 along the locking element 21 and hence bringing the second closure member 3 out of engagement with the first closure member 2. Because the arm 312 of the force application element 31 is located on the one side of the locking element 21, an opening movement in the opening direction Y2 alone is possible, but not in the opposite direction.

Because no handle is provided on the locking part 30, furthermore an opening of the closure device 1 by tilting the second closure member 3 for bringing it out of engagement with the blocking element 24 and the locking element 21 is, to the least, inconvenient, such that the linear opening movement indicated in FIGS. 15A to 15C represents the preferred opening movement in this embodiment.

Other than that the functionality of this embodiment is similar to the embodiment of FIGS. 1A, 1B to 7A to 7C, such that it shall be referred to the above.

In the embodiment of FIGS. 16A to 16C, magnets 23A, 23B, 33A, 33B are arranged on the first closure member 2 and the second closure member 3 such that they face each other with opposite poles along the engagement direction E. The magnets 23A, 23B herein are received in openings 260A, 260B of a reception body 26 of the first closure member 2. Locking elements 21A, 21B adjoin the reception body 26 at each side.

The magnets 23A, 23B preferably are oriented differently, such that they face towards the second closure member 3 with opposite poles (for example the magnet 23A with a North pole and the magnet 23b with a South pole).

The magnets 33A, 33B are received in openings 350A, 350B of a reception body 35 of the second closure member 3 and, similar to the magnets 23A, 23B, face the first closure member 2 preferably with opposite poles (for example magnet 33A with a South pole and magnet 33B with a North pole).

During closing of the closure device 1 the magnets 23A, 23B, 33A, 33B generate a magnetic attraction force along the engagement direction E such that the second closure member 3 is pulled in the engagement direction E into engagement with the locking elements 21A, 21B of the first closure member 2. Herein, on the locking part 30, a tilted face 309 is provided which, during closing, may run onto a tilted face 240 of blocking elements 24A, 24B, such that the blocking elements 24A, 24B do not hinder the closing movement of the second closure member 3.

Besides the different arrangement of the magnets 23A, 23B, 33A, 33B, the embodiment in principle is similar to the embodiment of FIGS. 1A, 1B to 7A to 7C, such that it also shall be referred to the above description.

In the embodiment of FIGS. 17A to 17D, a force application element 31 in the shape of a cable, rope, chain or the like is attached to the locking part 30 of the second closure member 3 via a fixing element 36. The force application element 31 herein reaches through an opening 360 of the fixing element 36 and an opening 362 of the locking part 30 such that it runs through a recess 213 in between locking elements 21A, 21B of the first closure member 2 in the closed position of the closure device 1. The force application element 31 in the shape of a cable, rope, chain or the like herein preferably is flexible such that—via its flexibility—it can pivot with respect to the locking part 30 of the second closure member 3.

The force application element 31 is fixed to the locking part 30 by inserting the fixing element 36 into an opening 361 of the locking part 30 and by inserting the force application element 31 into the opening 360 of the fixing element 36 and the opening 362 of the locking part 30. Herein, a ring 37 attached to the force application element 31 prevents the force application element 31 to slide through the opening 30 of the fixing element 36, such that the force application element 31 is held on the fixing element 36 and the locking part 30.

Besides the constitution of the force application element 31 and its fixing on the locking part 30 of the second closure member 3 the principle functionality of the embodiment is similar to the embodiment of FIGS. 1A, 1B to 7A to 7C, such that it shall be referred to the above.

Figure 19A:
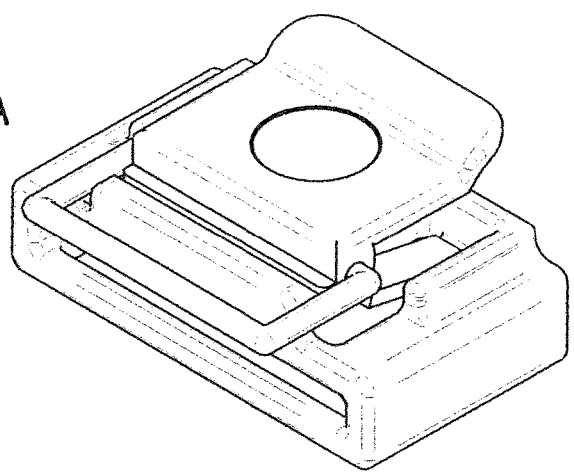
Figure 19B:
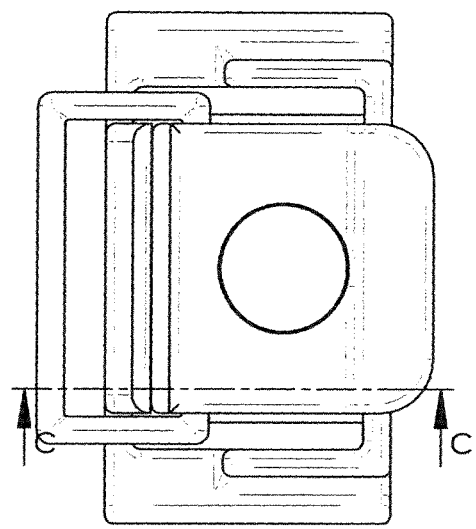
Figure 19C:
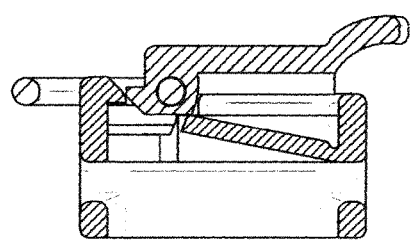

In the embodiment of FIGS. 18A to 18C to 21A to 21C blocking elements 24A, 24B in the shape of elastic tongues are provided on the base 20 of the first closure member 2. Such blocking elements 24A, 24B, while in principle serving the same purpose as the blocking element 24 described previously, hence are elastically arranged on the base 20 of the first closure member 2 and are, while closing the closure device 1, deflected when the locking part 30 comes into contact with the blocking elements 24A, 24B (see for example FIG. 19C).

By deflecting the blocking elements 24A, 24B the locking part 30 can be moved into engagement with the locking element 21 of the first closure member 2 in order to reach the closed position as indicated in FIGS. 20A to 20C. After the second closure member 3 with its locking protrusion 304 has come into engagement with the locking protrusion 210 of the first closure member 2, the locking elements 24A, 24B snap back into their original position and hence come to face a back face 308 on the locking part 30 such that the second closure member 3 is blocked in its engagement with the locking element 21 of the first closure member 2 against the engagement direction E. The blocking elements 24A, 24B hence secure the second closure member 3 in its closed position with respect to the first closure member 2.

Figure 21A:
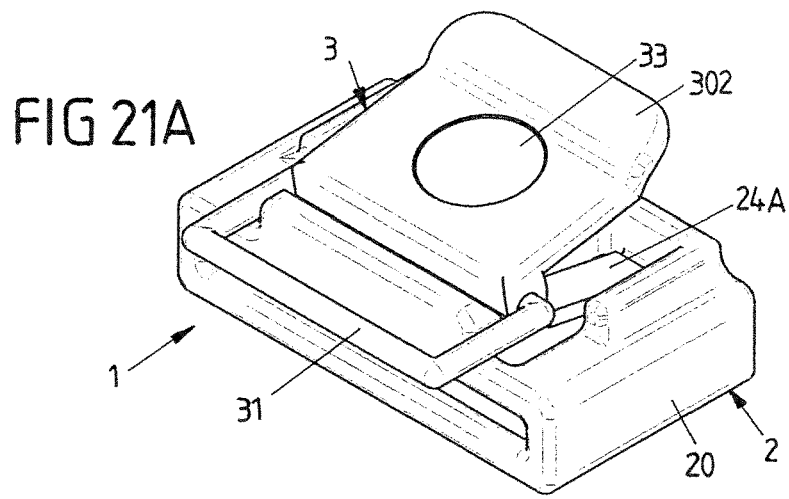
Figure 21B:
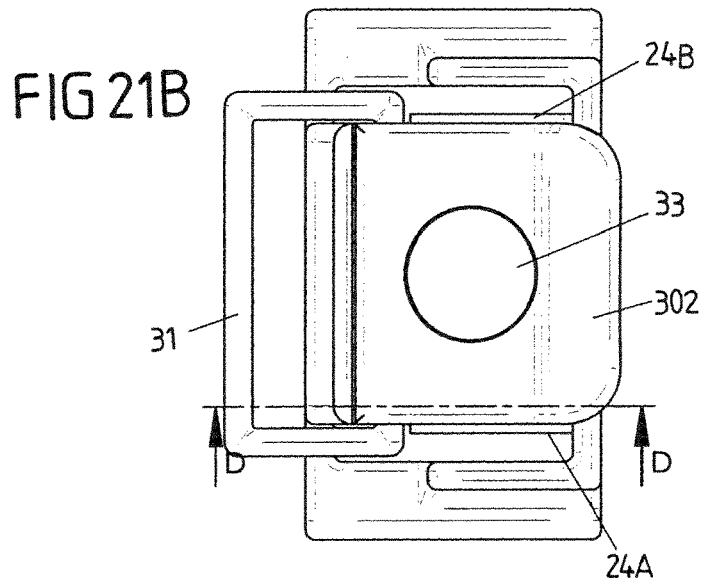
Figure 21C:
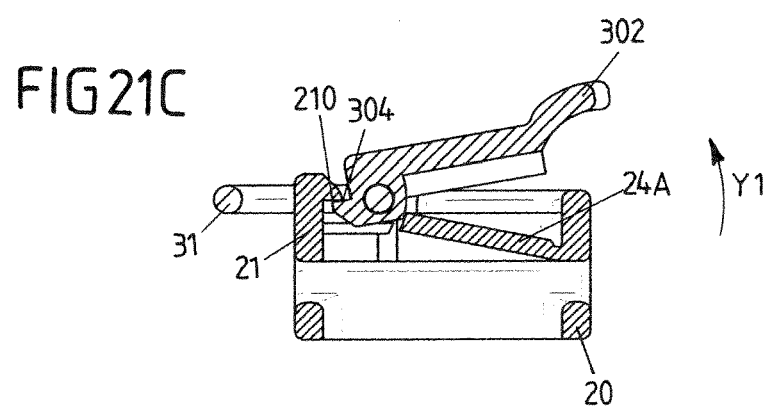

For opening the closure device 1 the second closure member 3 can be pivoted with respect to the first closure member 2 in an open direction Y1 as indicated in FIG. 21C, such that the second closure member 3 with its locking protrusion 304 comes out of engagement with the locking protrusion 210 of the first closure member 2 and the closure members 2, 3 can be separated from each other.

Other than that the principle functionality of the closure device 1 again is similar to the embodiment of FIGS. 1A, 1B to 7A to 7C, such that it also shall be referred to the above.

Figure 22A:
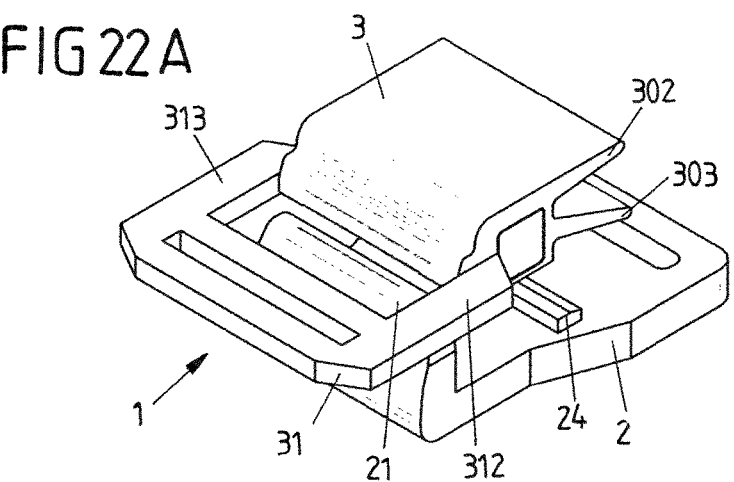
FIG. 22A shows a perspective view of another embodiment of the closure device.
Figure 22B:
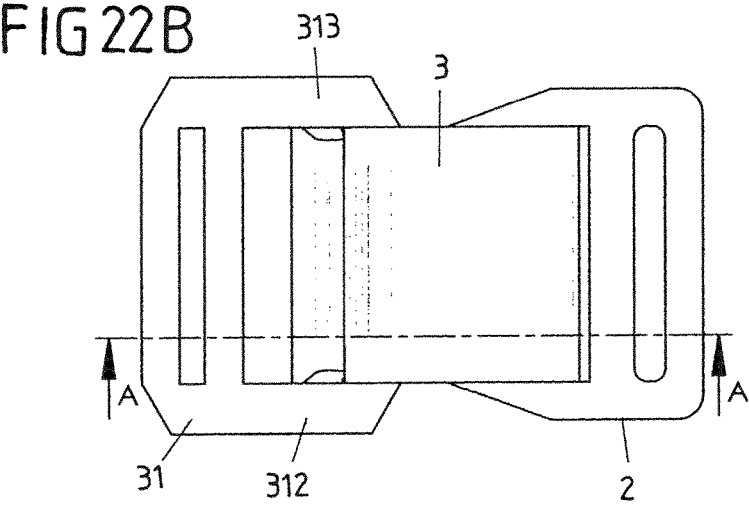
FIG. 22B shows a top view of the closure device.
Figure 22C:
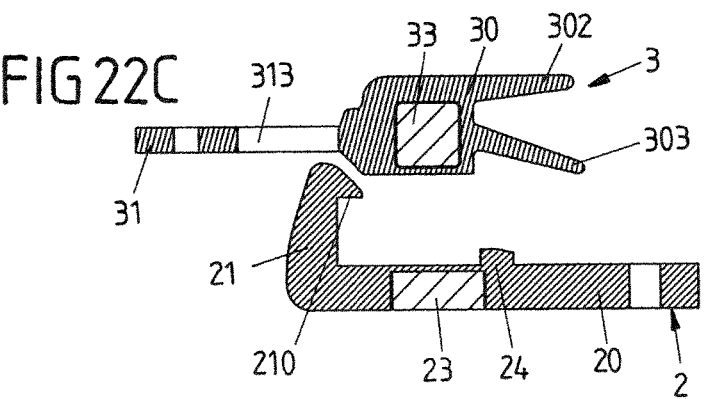
FIG. 22C shows a sectional view along line A-A according to FIG. 22B.

The embodiment of FIGS. 22A to 22C is similar to the embodiment of FIGS. 14A to 14C, but in this case the force application element 31 is rigidly attached to the locking part 30 of the second closure member 3 via two arms 312, 313 attached to opposite sides of the locking part 30.

While the closing movement is identical to the embodiment of FIGS. 14A to 14C, the closure device 1 of FIGS. 22A to 22C can be opened by a user by means of a handle 302 by pivoting it out of engagement with the locking element 21 of the first closure member 2, i.e. by tilting it with respect to the first closure member 2. No sideways movement for opening is possible due to the force application elements 31 reaching around the locking element 21 at both of its sides such that no horizontal displacement movement between the second closure member 3 and the first closure member 2 is possible.

Whereas the invention has been described above with reference to a number of specific embodiments, the invention is not limited to such embodiments. Rather, the invention may be carried our in entirely different ways not described herein.

While in particular the closing of the closure devices described above has been described with regard to approaching the second closure member to the first closure member, it is to be noted that for closing in principle both closure members may be approached to each other. In this regard, only the relative movement between the closure members is of importance and not which closure member is actually moved in order to approach the closure members towards each other.

Further, in the embodiments the closure members comprise or are attached to belt receptacles such that the closure device serves to connecting belts to each other. It is to be noted, however, that the closure device may be used for entirely different purposes to connect any parts to each other.

LIST OF REFERENCE NUMERALS

1 Closure device
2 Closure member
20 Base
200 Opening
201 Belt receptacle
21 Locking element
210 Locking protrusion
211 Tilted surface
212 Outer edge of locking protrusion
213 Recess
22 Magnet housing
220 Opening
23, 23A, 23B Magnetic member
230 Center
24, 24A, 24B Blocking element
240 Slanted face
25A, 25B Side element
26 Reception body
260A, 260B Opening
3 Closure member
30 Locking part
300 Force application location (line, point)
301, 301A, 301B Opening
302 Handle
303 Support element
304 Locking protrusion
305, 305A, 305B Opening
306 Tilted face
307 Front face
308 Back face
309 Slanted face
31 Force application element
310, 311 End
312, 313 Arm
32 Securing element
33, 33A, 33B Magnetic member
34 Axis
340 Recess
35 Reception body
350A, 350B Opening
36 Fixing element
360 Opening
361 Opening
362 Opening
37 Ring
4 Magnetic field sensor
E Engagement direction
X Closing direction
X', X" Tilting movement
Y1, Y2 Opening direction

The invention claimed is:

1. A closure device for releasably connecting two parts with each other, comprising
a first closure member having a rigid first locking portion,
a second closure member which is attachable to the first closure member and in a closed position is held on the first closure member, the second closure member having a rigid second locking portion, wherein the second locking portion can be brought into engagement with the first locking portion in an engagement direction and in the closed position engages the first locking portion in a positive locking manner,
wherein the first closure member comprises a first magnetic member and the second closure member comprises a second magnetic member, the first magnetic member and the second magnetic member being constituted to magnetically attract each other when the second closure member is attached to the first closure member for closing the closure device,
wherein a force application element is pivotably attached to the second locking portion at a force application location, the force application element being constituted to introduce a force into the second closure member,
wherein the first closure member further comprises a base and a locking element rigidly attached to the base and carrying the first locking portion, wherein the second closure member further comprises a locking part carrying the second locking portion and having a front face which, in the closed position, faces the locking element of the first closure member, and
wherein, in the closed position, when viewed in a direction opposite the engagement direction, the force application location on the second closure member is located between the front face and a center of the first magnetic member of the first closure member.

2. The closure device according to claim 1, wherein the force application element is a bracket pivotable about a pivot axis on the second closure member constituting the force application location.

3. The closure device according to claim 1, wherein the force application element is a rope, chain or cable pivotable about a pivot point on the second closure member constituting the force application location.

4. The closure device according to claim 1, wherein the force application element is adjustably attached to the second closure member.

5. The closure device according to claim 1, wherein the locking element with the first locking portion arranged thereon and the base forms a U-shaped recess in which the locking part with the second locking portion arranged thereon engages in the closed position of the closure device.

6. The closure device according to claim 5, wherein the first locking portion forms a first leg and the base forms a second leg of the U-shaped recess, the first leg and the second leg extending substantially parallel to each other.

7. The closure device according to claim 1, wherein the first closure member comprises a blocking element, wherein the blocking element in the closed position faces a back face of the second closure member facing in a direction opposite to the engagement direction, the blocking element being constituted to prevent the second locking portion from moving out of its engagement with the first locking portion in the direction opposite the engagement direction when the closure device is in its closed position.

8. The closure device according to claim 7, wherein the second closure member comprises a support element attached to the locking part and extending, in the direction opposite to the engagement direction, beyond the locking part, the support element being constituted to prevent an abutment of the back face with the blocking element prior to the second locking portion engaging the first locking portion.

9. The closure device according to claim 1, wherein
the first locking portion, on a side which in the closed position faces away from the second locking portion, comprises a slanted face or
the second locking portion, on a side which in the closed position faces away from the first locking portion, comprises a slanted face configured to guide the second locking portion, when attaching the second closure member in a closing direction perpendicular to the engagement direction to the first closure member, past the first locking portion when closing the closure device.

10. The closure device according to claim 1, wherein, for opening the closure device, the second closure member is
pivotable with its second locking portion about the first locking portion of the first closure member or
displaceable such that the second locking portion slides along the first locking portion to disengage the second locking portion from the first locking portion.

11. The closure device according to claim 1, wherein the force application element constitutes a belt receptacle for fixing a belt to the second closure member.

12. The closure device according to claim 1, wherein the first closure member carries a belt receptacle for fixing a belt to the first closure member.

13. The closure device according to claim 1, wherein the force application element is a bracket comprising two ends via which the force application element is pivotably attached to at least one opening of the second locking portion, wherein an attachment of the force application element to the second locking portion is secured by a securing element arranged on the bracket and preventing the ends from being detached from the at least one opening.

14. The closure device according to claim 1, wherein the magnetic members are arranged to generate an attractive force along the engagement direction or in a direction perpendicular to the engagement direction.

15. The closure device according to claim 1, further comprising a magnetic field sensor for sensing, in the closed position, a magnetic field produced by the magnetic members.

16. A closure device for releasably connecting two parts with each other, comprising
a first closure member having a rigid first locking portion,
a second closure member which is attachable to the first closure member and in a closed position is held on the first closure member, the second closure member having a rigid second locking portion, wherein the second locking portion can be brought into engagement with the first locking portion in an engagement direction and in the closed position engages the first locking portion in a positive locking manner, wherein the first closure member comprises a first magnetic member and the second closure member comprises a second magnetic member, the first magnetic member and the second magnetic member being constituted to magnetically attract each other when the second closure member is attached to the first closure member for closing the closure device, wherein the first closure member comprises a base and a blocking element rigidly attached to the base, wherein the blocking element in the closed position faces a back face of the second closure member facing in a direction opposite to the engagement direction, the blocking element being constituted to prevent the second locking portion from moving out of its engagement with the first locking portion in the direction opposite the engagement direction when the closure device is in its closed position, and wherein the first closure member comprises a locking element rigidly attached to the base and carrying the first locking portion, wherein the second closure member comprises a locking part carrying the second locking portion and having a front face opposite the back face, the front face, in the closed position, facing the locking element of the first closure member.

17. The closure device according to claim 16, wherein a force application element is pivotably or rigidly attached to the second closure member at a force application location, the force application element being constituted to introduce a force into the second closure member.

* * * * *